(12) United States Patent
Levin et al.

(10) Patent No.: US 12,510,747 B2
(45) Date of Patent: Dec. 30, 2025

(54) CALIBRATION DEVICE AND METHOD FOR HYPERSPECTRAL MEMS TUNABLE FILTER

(71) Applicant: UNISPECTRAL LTD., Ramat Gan (IL)

(72) Inventors: Peleg Levin, Rischon Le-Zion (IL); Eliahu Chaim Ashkenazi, Jerusalem (IL); Dor Saddan, Tel Aviv (IL)

(73) Assignee: UNISPECTRAL LTD., Ramat Gan (IL)

( * ) Notice: Subject to any disclaimer, the term of this patent is extended or adjusted under 35 U.S.C. 154(b) by 581 days.

(21) Appl. No.: 17/793,511

(22) PCT Filed: Jan. 20, 2021

(86) PCT No.: PCT/IL2021/050063
§ 371 (c)(1),
(2) Date: Jul. 18, 2022

(87) PCT Pub. No.: WO2021/149052
PCT Pub. Date: Jul. 29, 2021

(65) Prior Publication Data
US 2023/0123709 A1 Apr. 20, 2023

Related U.S. Application Data

(60) Provisional application No. 62/963,191, filed on Jan. 20, 2020.

(51) Int. Cl.
*G02B 26/00* (2006.01)
*G01M 11/02* (2006.01)
(Continued)

(52) U.S. Cl.
CPC ....... *G02B 26/001* (2013.01); *G01M 11/0285* (2013.01); *G02B 5/284* (2013.01);
(Continued)

(58) Field of Classification Search
None
See application file for complete search history.

(56) References Cited

U.S. PATENT DOCUMENTS

| 2012/0133947 A1 | 5/2012 | Nozawa |
| 2018/0080825 A1 | 3/2018 | Learmonth et al. |

FOREIGN PATENT DOCUMENTS

| CN | 101952751 A | 1/2011 |
| CN | 102084290 A | 6/2011 |

(Continued)

OTHER PUBLICATIONS

International Search Report and Written Opinion mailed Apr. 13, 2021 received in PCT/IL2021/050063.

*Primary Examiner* — Richard H Kim
(74) *Attorney, Agent, or Firm* — Ballard Spahr LLP

(57) ABSTRACT

According to one aspect of the presently disclosed subject there is provided a device configured figured to allow illumination of light towards a tunable filter, each time towards a different portion thereof, and detect the optical response, (e.g., transmission or reflection from the portion that is illuminated with light). By detecting optical response of isolated illuminations towards different portions of the tunable filter each time, the state of the tunable filter at the illuminated portion, e.g. the optical gap between a movable member and a stationary member of the tunable filter, can be determined. By monitoring different portions of the tunable filter, the general state of the tunable filter is determined. For example, the general state of the tunable filter may be determined based on the optical gaps at different portions of the tunable filter while the actuation parameters are maintained unchanged.

38 Claims, 14 Drawing Sheets

(51) Int. Cl.
*G02B 5/28* (2006.01)
*G06T 7/00* (2017.01)
*G06T 7/68* (2017.01)

(52) U.S. Cl.
CPC .............. *G06T 7/0002* (2013.01); *G06T 7/68* (2017.01); *G06T 2207/10152* (2013.01); *G06T 2207/30168* (2013.01)

(56) References Cited

FOREIGN PATENT DOCUMENTS

| | | |
|---|---|---|
| CN | 110207820 A | 9/2019 |
| WO | 2019058298 A1 | 3/2019 |

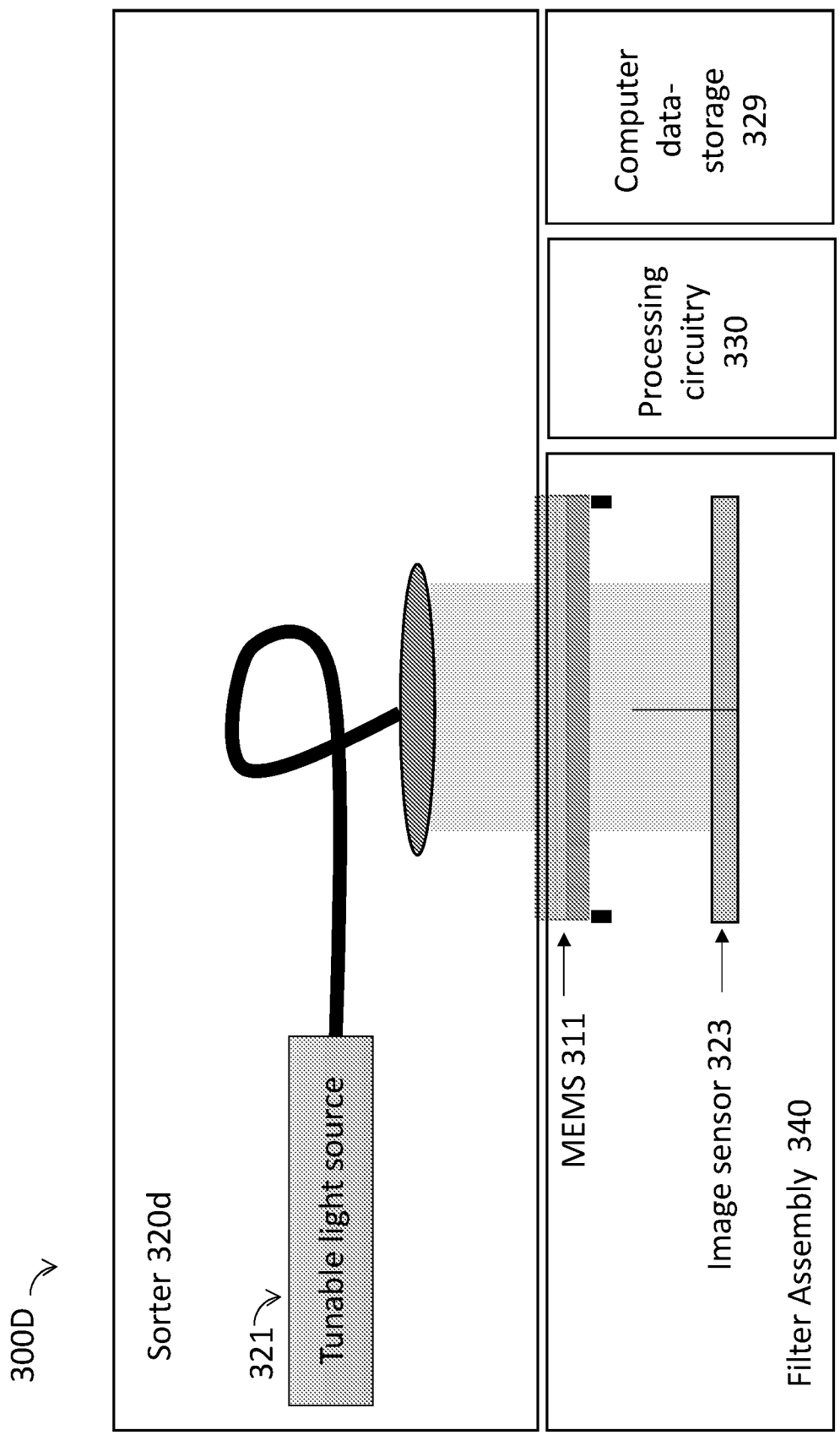

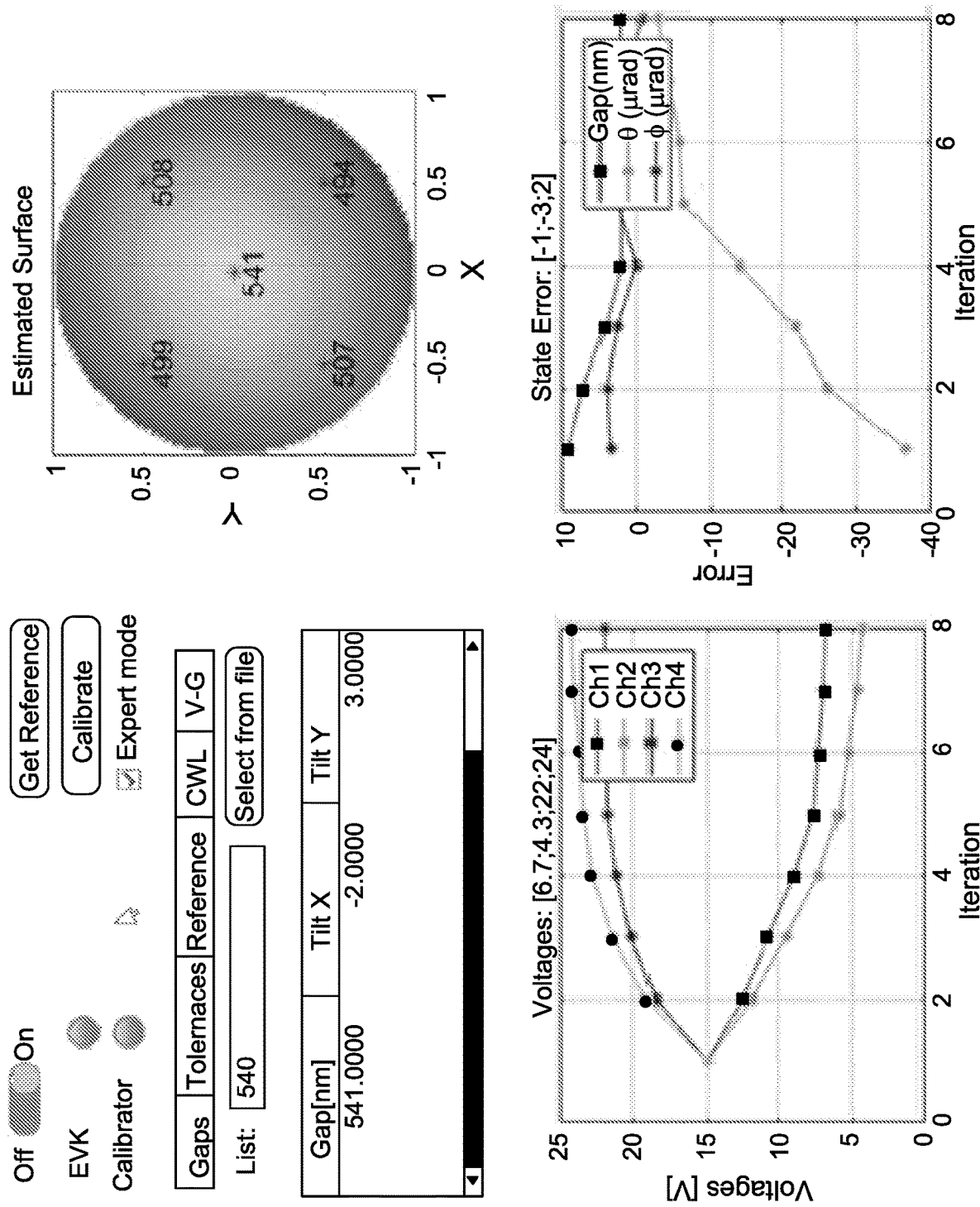

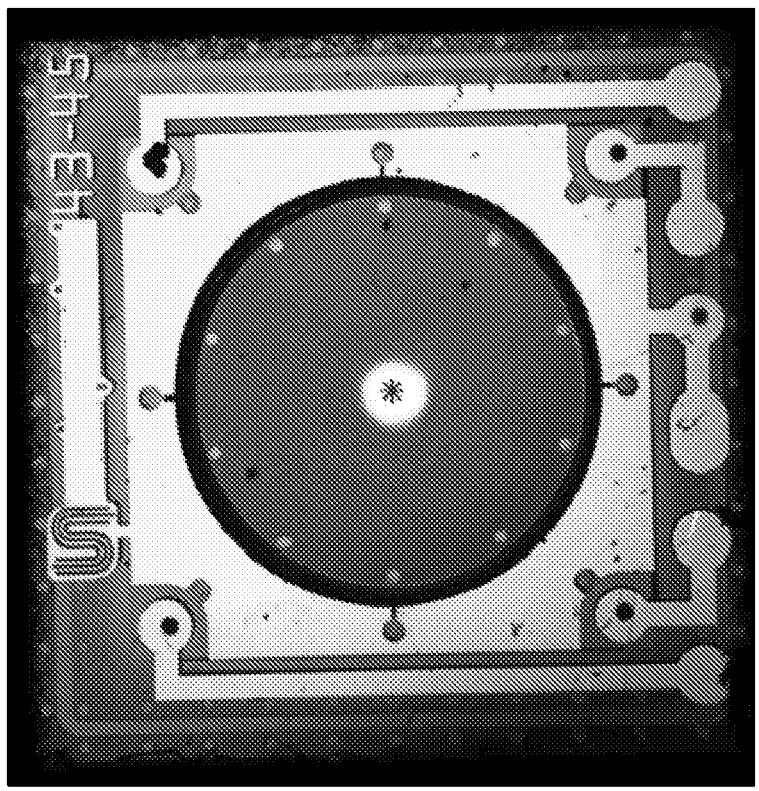
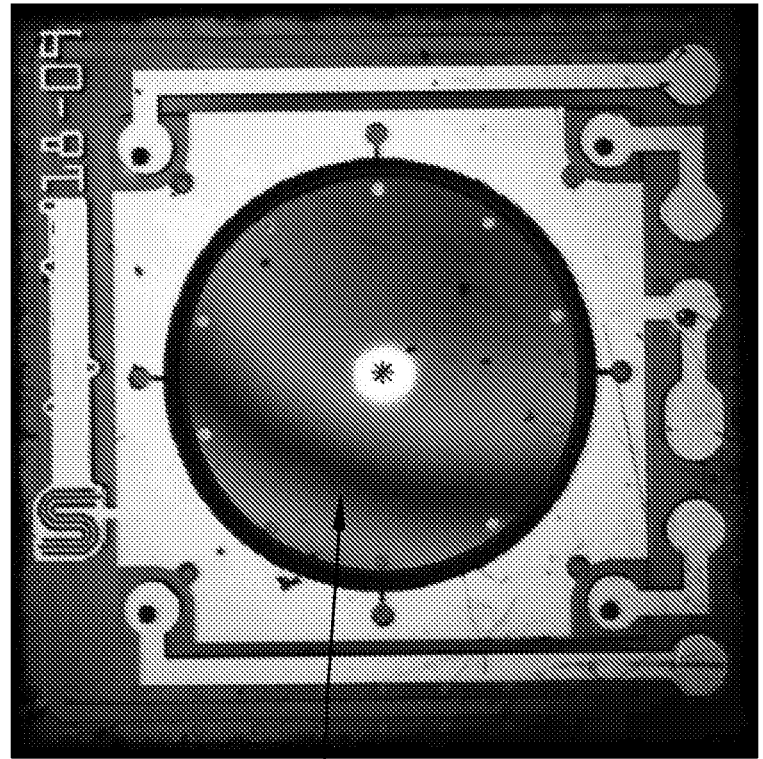
Fig. 8A
Fig. 8B

CALIBRATION DEVICE AND METHOD FOR HYPERSPECTRAL MEMS TUNABLE FILTER

TECHNOLOGICAL FIELD

The present disclosure is in the field of examination technologies for calibrating optical devices, in particular MEMS-based tunable filters.

BACKGROUND

Manufacturing process of relatively small devices usually leads to slight differences between different devices. For some devices, identifying these small differences may be of a great importance. For example, in the manufacturing of MEMS-based tunable filters, manufacturing differences may lead to substantive differences in the performances of these devices. Therefore, there is a great importance in developing tools for monitoring and identifying the exact state of such devices. By knowing the exact state of the device in different situations, the manufacturing differences and other defects that occur through the lifetime of such devices can be overcome.

GENERAL DESCRIPTION

The presently disclosed subject matter includes a device used for monitoring the state of a tunable filter e.g. a MEMS-based tunable filter. An example of a tunable spectral filter is an etalon (aka Fabry-Perot filter) that can be used for example for sequential imaging. An etalon comprises two parallel mirrors where the spectral transmission profile of the filter is determined by a respective "filter-state" defined by the specific gap between the mirrors (which provides a so called "optical cavity" or "optical gap").

In order to bring the tunable filter to the desired state, actuation parameters are applied to the tunable filter. For example, a tunable filter may be actuated by application of voltage difference between a movable member and a stationary member that results in electrostatic forces between the members, where the magnitudes of forces between different parts of the tunable filter determine the state to which the tunable filter is reached during the actuation. Each desired filter-state needs to be mapped with the respective actuation parameters that are applied for obtaining the state. In other words, the actuation parameters for achieving each desired filter-state (gap) are required to be obtained for proper operation of the tunable filter.

According to some examples, the device of the present disclosure is configured to direct light towards a tunable filter, each time towards a different portion thereof, and detect the optical response, namely the transmission or reflection from the portion that is illuminated with light. By detecting optical response of isolated illuminations towards different portions of the tunable filter each time, the state of the tunable filter at the illuminated portion, e.g. the optical gap between the a movable member and a stationary member of the tunable filter, can be determined. By monitoring different portions of the tunable filter, the general state of the tunable filter is determined. For example, the general state of the tunable filter may be determined based on the optical gaps at different portions of the tunable filter while the actuation parameters are maintained unchanged.

One aspect of the present disclosure is related to a device configured to determine the state of a tunable filter and optionally calibrate the device. The device according to this aspect can include for example, a light selective unit. The light selective unit is positioned between a light source and a tunable filter, placed at a designated location of the device, and configured to selectively transmit light emitted from the light source, towards one or more different spatial portions of the tunable filter. Namely, light originated from the light source propagates through the light selective unit to reach the tunable filter. It is to be noted that according to the state of the light selective unit, some of the light, may be filtered out before it reaches the tunable filter. The light source is characterized by a given/known illumination profile (e.g., a light source with a known illumination spectrum).

In some examples, the device includes a tunable filter mount for holding the tunable filter. It is to be noted that the tunable filter mount may be a location with respect to the device that is suitable for placing the tunable filter to be operated with the device, e.g. a surface that the tunable filter is laid on. In some other embodiments, the tunable filter mount may be a physical element that attaches the tunable filter to the device during the operation of the device.

In some examples of the device, the tunable filter mount includes a tunable filter receptacle for receiving the tunable filter and maintaining it in position during a monitoring procedure. It is to be noted that the tunable filter receptacle may be configured according to various suitable configurations and designs.

In some examples, the device is configured for on-device calibration and includes a camera mount or holder for holding a camera comprising a tunable filter. It is to be noted that the camera mount may refer to a location with respect to the device that is suitable for placing the camera to be operated with the device, e.g., a surface that the camera is laid on. In some other embodiments, the camera mount may be a physical element that attaches the camera to the device during the operation of the device.

In some examples, the device includes guiding optics for guiding the light originated from the light source towards the light selective unit and the tunable filter.

In some examples, the device further includes an optical assembly holder configured for holding optical assembly that includes a light source. The light source is being held such that it illuminates, when in position and operated, in the direction of the tunable filter receptacle. When a tunable filter is received by the tunable filter receptacle, the light source that is held by the optical assembly holder is configured to illuminate the tunable filter or portions thereof.

In some examples, the light selective unit is positioned between the optical assembly holder and the tunable filter receptacle and comprises one or more surfaces that are configured for selectively transmitting light of the light source, when the light source is illuminating in the direction of the tunable filter, towards different spatial portions on the tunable filter. The light selective unit is capable for transmitting light towards a single portion of the tunable filter at a time. Different states of light selective unit are designed to transmit light to different portions of the tunable filter, when is received in the tunable filter receptacle.

In some examples, the light selective unit is configured to transmit light simultaneously to a plurality of portions of the tunable filter.

The optical response of the tunable filter to the light illuminated by the light source in the portions of the tunable filter is indicative of the tunable filter-state in a location associated with said one or more portions. In other words, the optical response of the illumination at a portion of the tunable filter is indicative of the gap between the two optical members of the tunable filter at the portion. Wherein a collection of optical responses, each from a respective portion of the tunable filter, are indicative of the gap and the tilt values of the tunable filter (considering the geometry of the filter, e.g. bow shaped).

It is to be noted that the term "optical response" includes any one of transmission and reflection of light.

In some examples of the device, the tunable filter receptacle includes a depression having dimensions adapted for receiving the tunable filter. In some examples, the dimensions of the depression are designed for snugly receiving the tunable filter.

In some examples, the tunable filter receptacle includes a retaining mechanism for retaining the tunable filter in position. For example, the retaining mechanism may include protrusions that are configured to be received by the tunable filter or a frame holding the tunable filter for securing the tunable filter in position.

In some examples, wherein the device is configured for on-device calibration, the camera mount includes a retaining mechanism for retaining the camera in position. For example, the retaining mechanism may include a frame holding the camera for securing the camera in position, the frame being adaptable to fit the size of the camera.

In some examples, the tunable filter receptacle is configured to form an electrical coupling with a tunable filter that is received therein to allow to control its operation, e.g. to apply actuation parameters.

In some examples of the device, the optical assembly holder unit is configured for holding a light source such that its optical axis aligns with the optical axis of the tunable filter, when the tunable filter is received in the tunable filter receptacle. In this configuration, the center of the beam of the light source is directed towards the optical members of the tunable filter. In some embodiments, the optical assembly holder unit is configured for holding a light source such that its optical axis passes through portions of the light selective unit and/or tunable filter receptacle. In other words, the optical assembly holder unit is configured for holding a light source such that its light spot overlaps with portions of the light selective unit and/or tunable filter receptacle.

In some examples, the light selective unit is configured to allow the transmission of light towards a single portion on the tunable filter at a time, namely states of the light selective unit (herein "light selective states") provide singular illumination at a portion of the tunable filter.

A single portion should be understood as a single location of the tunable filter that is illuminated/stained by the light source. In other words, a single portion is an area (e.g., of the tunable filter) that is covered by a spot of light that is being illuminated by the light source.

In some examples, where the device is configured for on-device calibration, the optical assembly holder unit is configured for holding a light source such that its optical axis aligns with the optical axis of the camera, e.g., when the camera is being held by the camera mount. In this configuration, the center of the beam of the light source is directed towards the optical axis of the camera, where a lens barrel and the tunable filter are aligned along the optical axis. In some examples, the optical assembly holder unit is configured for holding a light source such that its optical axis passes through portions of the light selective unit and/or tunable filter receptacle. In other words, the optical assembly holder unit is configured for holding a light source such that its light spot overlaps with a part of the area of the light selective unit and/or tunable filter.

In some examples of the device, the light selective unit is configured for filtering desired light bandwidth to illuminate different portions on the tunable filter. In some embodiments, the light selective unit is configured to filter only one of red, green, blue or IR light to reach and interact with one or more portions of the tunable filter. The filtering of a certain bandwidth may be applied such that different portions of the tunable filter are illuminated with the desired filtered bandwidth, each state of the light selective unit results in a filtered illumination of a different portion of the tunable filter. In yet another embodiment, the light selective unit is configured for filtering two different bandwidths of light such that at least two portions of the tunable filter are illuminated simultaneously, each with a different filtered light.

In some examples, the light selective unit is configured to apply one or more filters for filtering of one or more desired bandwidths to obtain a filtered light that interacts with different portions of the tunable filter.

In some examples a designated light filter configured for filtering desired light bandwidth to illuminate different portions of the tunable filter is used in addition to the light selective unit or when the light selective unit is not used.

The expected tunable filter's optical response profile of a filtered wavelengths is predetermined, e.g. measured in prior experiments or pre-calculated. Thus, the optical response that is being detected by utilizing the device, is analyzed and by identifying in the detected response a matching profile to that of the predetermined profile, the gap between the optical members of the tunable filter can be deduced.

In some examples, the light selective unit includes a stationary surface having a plurality of stationary pinholes. Illumination from the light source that is directed through each of the stationary pinholes, illuminates one portion of the tunable filter at a time. In some other embodiments, illumination from the light source that is directed through each of the stationary pinholes, illuminates one or more portions of the tunable filter at a time. It is to be noted that in order to obtain accurate and focused spotlight on the tunable filter, in some examples, the stationary pinholes are characterized by a relatively large aspect ratio, namely the pinholes are elongated so they are long and narrow.

In some examples of the device, each of the one or more stationary pinholes is configured to be switched between transmitting mode and blocking mode and/or bandwidth filter mode, i.e., filtering certain bandwidth of light. In other words, each stationary pinhole is configured to block light transmission at one state and allow transmission of a selected wavelength range and/or intensity at a different state thereof.

In some examples of the device, the one or more stationary pinholes are elongated, namely their depth along a vertical axis is much greater than their largest horizontal dimension, e.g., their diameter when they have a cylindrical shape. This results in an accurate and focused light spot on the tunable filter that is originating mostly from collimated light.

In some examples of the device, the light selective unit includes a moving surface positioned above or below the stationary surface and the light source (e.g., between the stationary surface and the light source), and the moving surface is formed with one or more moving pinholes. Movement of the moving surface results in the switching between different states, where in each state different moving pinholes are aligned with different stationary pinholes, thereby allowing different portions of the tunable filter to be illuminated in each state.

It is to be noted that in some examples, the light selective unit may include only a moving surface that is configured to switch between different light selective states, each state is configured for exposing (i) different portion of the tunable filter for illumination and/or (ii) applying different filter for exposing the tunable filter for different light bandwidths.

In some examples, the light selective unit includes a stationary surface, where a certain region of the stationary surface blocks light illuminated by the light source (giving rise to a "light blocked region"), whereas the other region of the surface is transparent to light emitted by the light source. Illumination by the light source that is directed towards the light selective unit, illuminates a portion of the tunable filter at a time, i.e., the portion corresponding to the transparent region. According to one example, half of the light selective unit is configured as a light blocked region the other half is transparent to light emitted by the light source. According to another example, the light selective unit is divided into quarters, where two quarters are configured as light blocked regions and the two quarters are transparent to light emitted by the light source.

In some examples of the device, rotational movement can be applied to the light selective unit around its center, where a rotational movement of the light selective unit causes the unit to switch between different light selective states, where in each light selective state a different portion (e.g., different half) of the tunable filter is illuminated by the light source. Notably, the rotational movement can be angular, planner or any other type of movement other than angular movement. In some examples, each light selective state results in a light transmission of a single portion on the tunable filter.

In some examples, the device includes a driving unit configured for switching the light selective unit between light selective states. For instance, a servo motor or step motor can used for turning the light selective unit and switching between different light selective states.

In some examples, the light selective unit can be configured to electronically screen the emitted light. For example, the light selective unit can be an LCD screen, where in different light selective states, different areas of the screen are actuated in a manner that either block or transmit the light emitted by the light source.

In some examples of the device, the moving pinholes have larger dimensions than the stationary pinholes, i.e. larger diameter. This allows a looser placement tolerance of the moving surface relative to the stationary one to permit a proper transmission of light through the pinholes array, including the stationary and the moving pinholes.

In some examples of the device, the optical assembly holder includes a longitudinal bore that includes guiding optics for guiding light therethrough, wherein the light is emitted from the light source that is received in the optical assembly holder.

According to another aspect of the presently disclosed subject matter there is provided a system that includes the device in any of its above describe examples. The system further includes a light source for providing said known illumination spectrum.

In some examples of the system, the light source is being held in the optical assembly holder and is configured to illuminate the tunable filter.

In some examples, the system further includes the tunable filter.

In some examples, the system includes a light detector for detecting the optical response from the illuminated portions of the tunable filter.

In some examples of the system, the light detector is a spectrometer or an image sensor (e.g., RGB, IR-RGB, or monochromatic). The spectrometer can be capable of detecting and analyzing light of a relatively wide spectrum, e.g., the entire visible and IR spectrum. The spectrometer may provide data that includes detected intensities of wide range of wavelengths.

In some examples of the system, the light detector is being held in the optical assembly holder and configured to detect the reflection of the illumination of the light source on different portions of the tunable filter.

In some examples of the system, the light source and the light detector are formed in a single optical unit, i.e., sharing some of the optics and having a common optical axis. For example, the single optical unit that comprises the light source and the detector may include an optical fiber, such as a Y-bundle for reflection and backscatter spectroscopy/reflection probe type.

In some examples, the system includes a processing circuitry (or more than one) that is configured to control execution of one or more of the following:

(a) applying actuation parameters, e.g., application of different voltages in each of the electrodes of the tunable filter, for controlling the state of the tunable filter (e.g. of the moveable member), i.e. a gap from a stationary member of the tunable filter and the angular position with respect to the stationary member, e.g. roll, or pitch. The state of the movable member defines the optical response of the tunable filter;

(b) controlling the light selective unit for determining the portions of the tunable filter that are illuminated by the light source. This is carried out by switching between states of the light selective unit, e.g., by driving (e.g. rotating) the moving surface from one state to another. Furthermore, the processing circuitry can be configured to control the filtering of light that is transmitted towards portions of the tunable filter;

(c) controlling the spectral transmission of the light selective unit, i.e. controlling the light selective unit for transmitting a selected wavelength range of illumination towards the tunable filter;

(d) analyzing optical responses from one or more portions of the tunable filter, determining the tunable filter-state based thereon, and determining if the state of the tunable filter satisfies a predetermined condition. The predetermined condition is satisfied if different optical gaps of different portions of the tunable filter are within a predetermined tolerance range and/or if the angular angle of the movable member with respect to the stationary member is within the predetermined angular tolerance;

(e) tuning the illumination spectrum of the light source.

In some examples of the system, wherein the state of the tunable filter does not satisfy the predetermined condition, the processing circuitry is further configured to iteratively apply new actuation parameters for bringing the state of the tunable filter to the desired condition. Upon obtaining the desired predetermined condition, the processing circuitry is configured to store the actuation parameters in a computer data-repository device (e.g. NAND flash memory device), to be executed in order to bring the tunable filter to the respective state, namely the desired optical gap.

In some examples of the system, the light source is configured to illuminate a broad bandwidth of light that comprises the visible and IR light.

In some examples of the system, the processing circuitry operatively connected to the device is configured for matching the optical response of said known illumination spectrum in the tunable filter with a reference data of a predetermined optical response profile for identifying recognizable patterns (such as peaks of intensity) indicative of the state of the tunable filter, e.g. a certain optical gap, wherein the optical response may be either transmission of the illumination through the tunable filter or reflection of the illumination from the tunable filter. In other words, reference data of optical response profiles of various wavelength ranges, e.g. detected transmission by an image sensor of a certain wavelength through the tunable filter, is predetermined and stored in a memory. This reference data is correlated with intensity profile of the optical response of the tunable filter being calibrated, e.g. detected intensity profile in an image sensor of the transmission of a certain wavelength through the tunable filter. By identifying matching profiles between the predetermined reference data and the detected intensity profile, the state of the tunable filter being calibrated is determined.

In some examples of the system, the reference data, i.e. the recognizable patterns indicative of the state of the tunable filter, includes one or more predetermined intensity profiles of optical response of one or more wavelength ranges, or specific wavelengths, e.g. red, green, blue or IR.

Yet another aspect of the present disclosure provides a method for monitoring a state of, and/or calibrating a tunable filter. The method includes applying actuation parameters to the tunable filter, e.g., tuning the tunable filter to an estimated optical gap between the movable member and the stationary member of the tunable filter. The estimated optical gap is characterized by a certain light transmission profile or light reflection profile.

The method further includes illuminating one or more portions of the tunable filter and detecting optical response, i.e. transmission or reflection, from said one or more portions. Then, analyzing the optical responses from the illuminated portions of the tunable filter and identifying the tunable filter-state based thereon, and determining if the state of the tunable filter satisfies a predetermined condition. The predetermined condition is satisfied if different optical gaps of different portions of the tunable filter are within a predetermined tolerance range and/or if the angular angle of the movable member with respect to the stationary member is within the predetermined angular tolerance.

In some examples of the method, wherein the state of the tunable filter does not satisfy the predetermined condition, the method includes iteratively applying new actuation parameters for bringing the state of the tunable filter to the desired condition. Upon obtaining the desired condition, the actuation parameters are being stored in a memory.

In some examples of the method, applying new actuation parameters includes applying different actuation parameters on different portions of the tunable filter. Namely, applying a new set of electrostatic/piezoelectric/magnetic/mechanical forces between the actuation electrodes/means of the tunable filter, resulting in new state of the tunable filter.

In some examples, the method includes filtering the illumination for illuminating said one or more portions with a desired bandwidth of wavelengths, or a specific wavelength, e.g. red, green, blue or IR light.

In some examples of the method, detecting optical response includes detecting a spectroscopic profile of the optical response. This includes detecting intensities of a variety of wavelengths.

In some examples of the method, the analyzing includes identifying a predetermined profile of the optical response to determine the state of the tunable filter.

In some examples of the method, the predetermined profile is characterized by a rate of change of the transmission or reflection profile of a certain wavelength through or from the tunable filter, e.g. local minima or maxima, a known differential function, etc.

In some examples, the method includes matching the optical response with a reference data of a predetermined illumination profile. The optical response may be either transmission of the illumination through the tunable filter or reflection of the illumination from the tunable filter.

In some examples of the method, the reference data includes one or more intensity profiles of optical response of one or more wavelengths ranges or one or more specific wavelengths.

Yet another aspect of the present disclosure provides a non-transitory program storage device readable by a computer, tangibly embodying a computer readable instructions executable by the computer to perform a computerized method of any one of the above-described examples of the method according to various examples of the aspect above.

According to another aspect of the presently disclosed subject matter there is provided a device comprising a processing circuitry operatively connected to a detector (e.g. image sensor or spectrometer); wherein the device is configured to interact with a tunable filter (e.g. Fabry-Perot, etalon) and enable a light source to illuminate the tunable filter with a light beam; the processing circuitry is configured to:

determine, based on different optical responses, each optical response received at the detector from a respective illumination by the light source of a certain spatial portion of the tunable filter, whether the filter state complies with a desired condition; and in case it does not, apply updated actuation parameters for bringing the state of the tunable filter to the desired condition.

In some examples of the device, the processing circuitry is configured to iteratively apply updated actuation parameters and compare between different optical responses until the state of the tunable filter is determined to be at a desired condition.

In some examples of the device, it further comprises a light selective unit positioned between the tunable filter and the light source and configured to selectively transmit light illuminated by the light source during a respective illumination towards a certain spatial portion of the tunable filter giving rise to a respective optical response;

the light selective unit is configured to be switched between different light selective states, wherein a different spatial portion of the tunable filter is illuminated in each light select state and wherein the different optical responses which are compared by the processing circuitry are each obtained when the light selective unit is in a respective light selective state.

In some examples of the device, the processing circuitry is configured to automatically switch the light selective unit between the different light selective states.

In some examples of the device, the processing circuitry is further configured upon obtaining the desired condition, to store the actuation parameters in a computer data-storage device operatively connected to the device.

In yet another aspect of the presently disclosed subject there is provided a method for adjusting a tunable filter, comprising movable and static members and a plurality of at least three actuators adapted for controlling a state of said tunable filter by actuating a relative position of the movable member relative to said static member: the method comprising:

detecting a plurality of optical responses each optical response obtained in response to illumination of a plurality of different spatial portions of the tunable filter; said detected optical responses being indicative to of state of said tunable filter associated with of geometric parameters of a gap between the movable and static members; and based on said optical responses, determining updated actuation parameters for operating the plurality of actuators to adjust the state of said tunable filter towards a desired state.

In some examples the method comprises illuminating said filter at a plurality of (at least three) different spatial portions thereof;

In some examples of the method the plurality of at least three actuators comprise at least four actuators.

In some examples of the method the initial actuation comprises:

providing a model indicative of an estimated resulting states of a general filter of a type of said tunable filter in response to actuation of the actuators of the general filter of said type with respective sets of actuation parameters;

utilizing said model for carrying out at least one of the following:

I. prior to said detecting, setting an initial actuation of said filter, whereby said setting includes determining, based on said desired state, the initial set of actuation parameters for initial operation of said tunable filter; and II. determining said updated actuation parameters by carrying out the following:
   a. utilizing said model [e.g. a derivate thereof] to determine an incremental corrections to the certain actuation parameters of the tunable filter, for which said optical responses are obtained; and
   b. determining said updated actuation parameters based on said certain actuation parameters with said incremental corrections.

In some examples of the method the model comprises a compliance function of said tunable filter whereby the compliance function [F1] is independent of the actuation parameters.

In some examples of the method the actuation parameters include a number N of at least three actuation parameters $[V_1, V_2, \ldots V_N]$ which are associated with said at least three actuators respectively; and wherein the said state of said tunable filter is characterized by at least the following geometric parameters of said gap: the size co of said gap being a nominal distance between said movable and stationary members, relative lateral orientation angles $\theta$ and $\phi$ between said movable and stationary members.

In some examples of the method the determining of said updated actuation parameters comprises carrying out the following:

(a) providing diagonalized sets of three actuation parameters $[V_\theta, V_\phi, V_w]$ being formed as a predetermined linear combination of said at least three actuation parameters $[V_1, V_2, \ldots V_N]$ and characterized a change in each of the diagonalized actuation parameters $[V_w, V_\theta, V_\phi]$ affects a respective change in a corresponding one of the geometric parameters $\omega$, $\theta$ and $\phi$, while substantially not affecting a change in other ones of said geometric parameters; and (b) processing the said optical responses to determine a prevent state of the tunable filter in terms of said geometrical parameters;

(c) determining a desired incremental correction for the diagonalized actuation parameters based on a difference between said present state and the desired stated of the tunable filter, thereby yielding a set of corrected diagonalized actuation parameters;

(d) determining the correction for said at least three actuation parameters $[V_1, V_2, \ldots V_N]$ according to the set of the corrected diagonalized actuation parameters.

The presently discloses subject matter further contemplates a system comprising a processing circuitry operatively connected to a tunable filter and configured to execute a computerized method of any one of the above-described examples of the method according to the preceding aspect.

The presently discloses subject matter further contemplates a non-transitory program storage device readable by a computer, tangibly embodying a computer readable instructions executable by the computer to perform a computerized method of any one of the above-described examples of the method according to the preceding aspect.

The term processing circuitry as used herein should be broadly construed to include any kind of electronic device with data processing capability, which includes (at least one) computer processing device configured to and operable to execute computer instructions stored, for example, on a computer memory being operatively connected thereto. Examples of such a device include: digital signal processor (DSP), a microcontroller, a field programmable gate array (FPGA), an application specific integrated circuit (ASIC), etc.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a perspective view of a top portion of the device; FIG. 1B is a top view; FIG. 1C is a side view; FIG. 1D is a perspective view of a bottom portion of the device; and FIG. 1E is a bottom view of the device;

FIGS. 3C-3D are schematic illustrations of calibration systems according to some examples of the presently disclosed subject matter;

FIGS. 6A-6B are non-limiting examples of different phases of calibration as presented in a user interface of a software being used to calibrate a tunable filter by the device of the present disclosure, according to some examples of the presently disclosed subject matter;

FIGS. 8A-8B are images of a Fabry-Perot tunable filter, taken during illumination of the filter from top view, in calibrated state and un-calibrated state.

DETAILED DESCRIPTION OF EMBODIMENTS

Figure 1A:
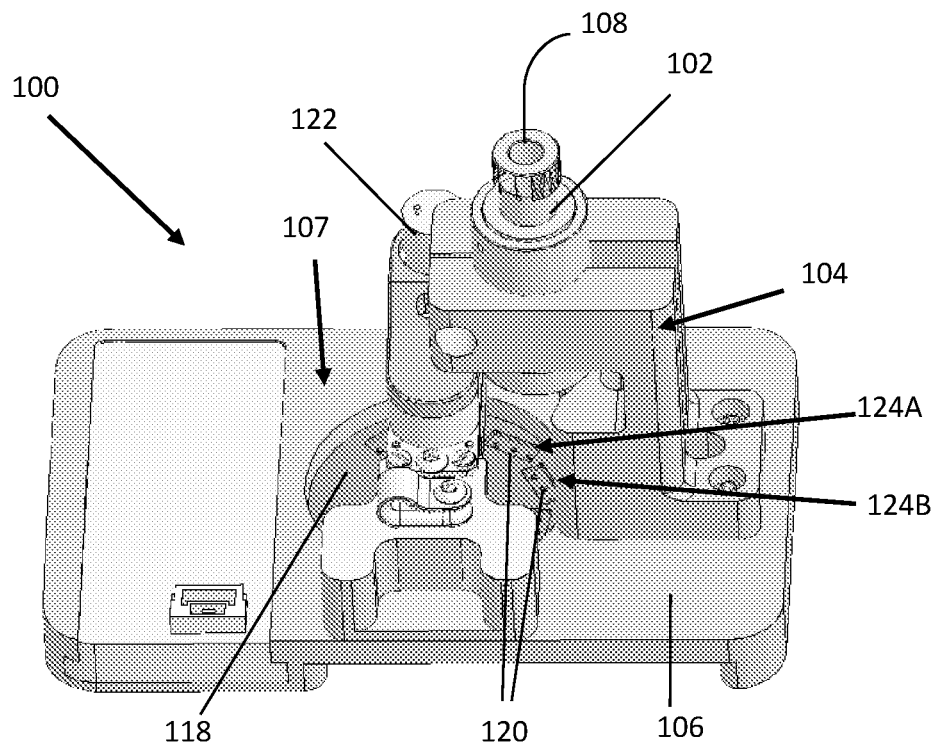
FIGS. 1A-1E are schematic illustrations of different views of a device according to some examples of the presently disclosed subject matter.
Figure 1B:
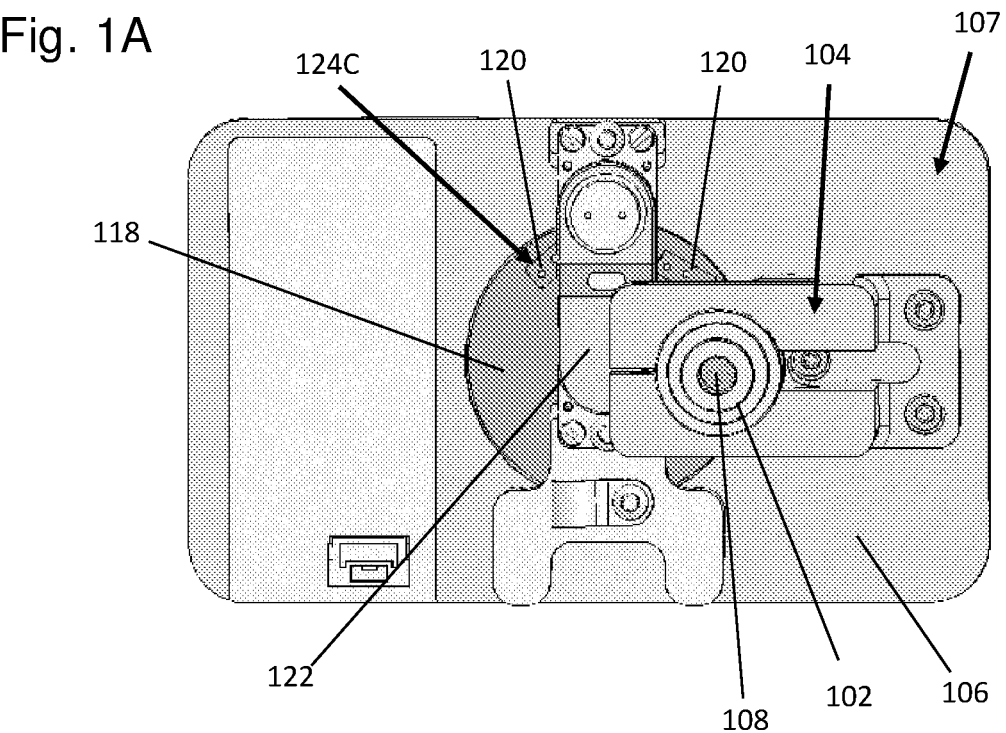
Figure 1C:
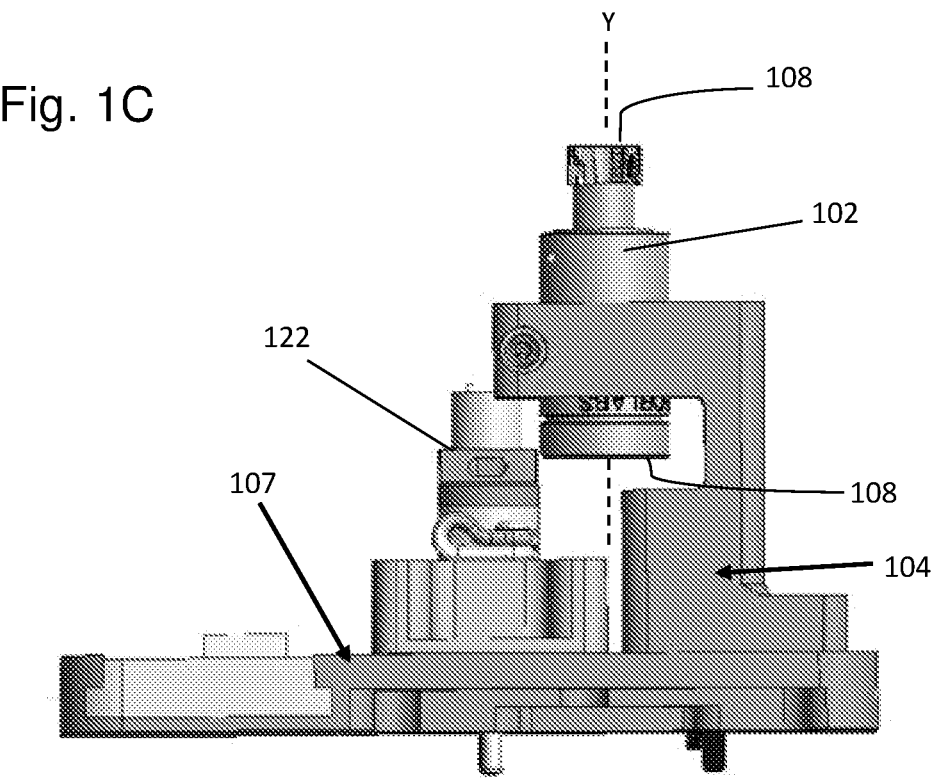

The following figures are provided to exemplify embodiments and realization of the invention of the present disclosure.

Reference is first being made to FIGS. 1A-1E exemplifying different views of a device according to some examples of the presently disclosed subject matter. Additional examples of calibration devices are described below with reference to FIGS. 3A-3E. The device 100 includes an optical assembly holder 102 that is mounted on a supporting structure 104 extending from an upward facing face 106 of a base 107 of the device 100. It is to be noted that relative terms throughout the specification, such as upward, downward, etc., are brought for the ease of description and are not binding to any direction or orientation. The optical assembly holder has a cylindrical shape and is formed with a longitudinal bore 108 extending along an axis Y of the assembly, as can be best seen in FIG. 1C, and configured to receive optical assembly (not shown) that includes optical components, e.g. a light source and/or a light detector. The optical assembly may be formed of an optical fiber that is configured to emit light, e.g. light in the visible and/or IR spectra, and configured to detect light of similar spectra, i.e. visible and/or IR. It is to be noted that the illuminated spectrum by the light source and the detected spectrum by the detector may be different.

Figure 1D:
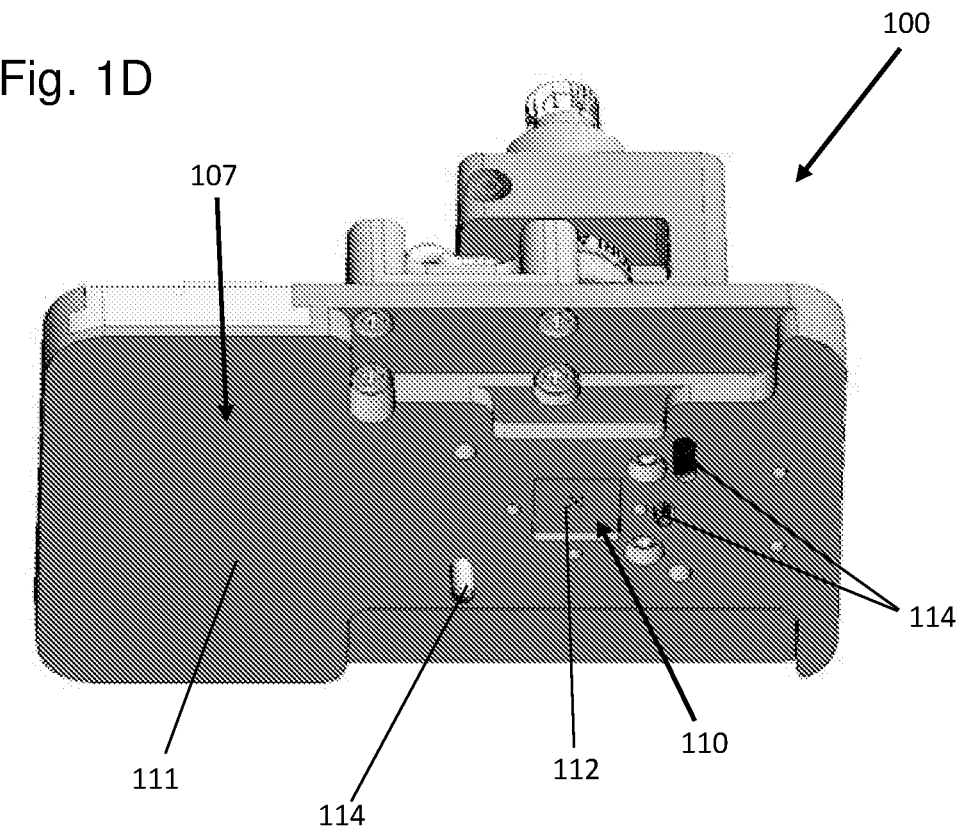
Figure 1E:
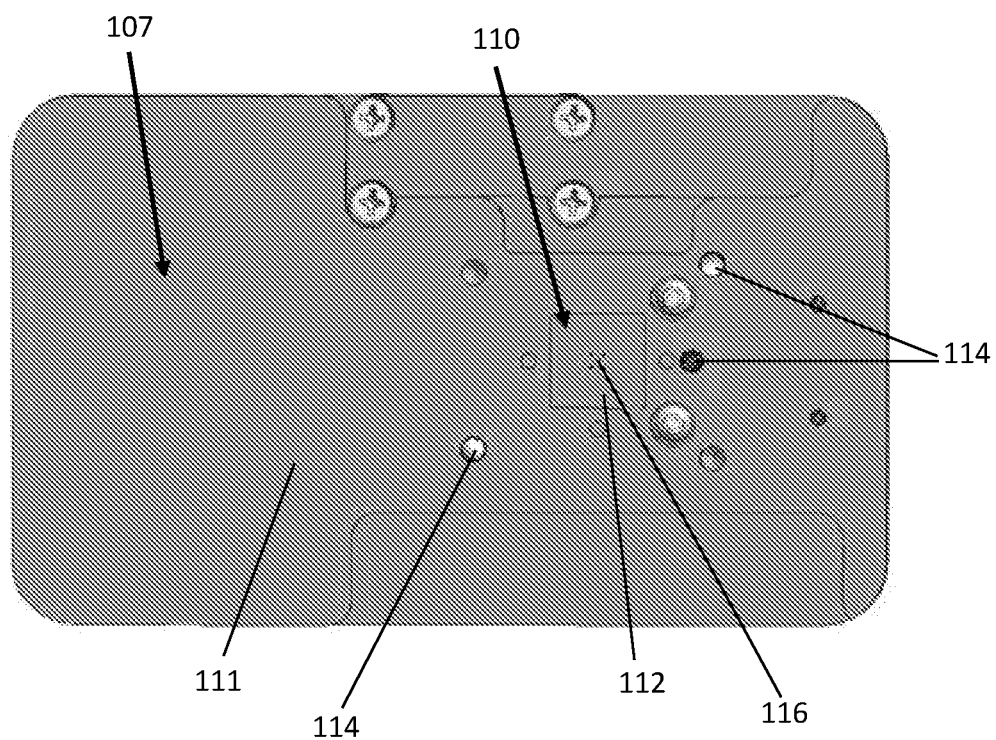

A tunable filter receptacle 110 is formed at a downward facing face 111 of the base 107 of the device 100, as can be best seen in FIGS. 1D-1E. The tunable filter receptacle 110 includes a receptacle e.g., in a form of a depression 112 in the base 107, into which the tunable filter fits. Therefore, the depression 112 is configured to receive the tunable filter and attachment elements 114, e.g., a location pin for positioning the tunable filter and a bolt for fixing it, are configured to attach and hold the tunable filter, or a frame holding the tunable filter, to the device 100 during calibration process. In some examples, the receptacle is configured to receive a tunable filter integrated into a device such as a camera ("on-device calibration").

Figure 2:
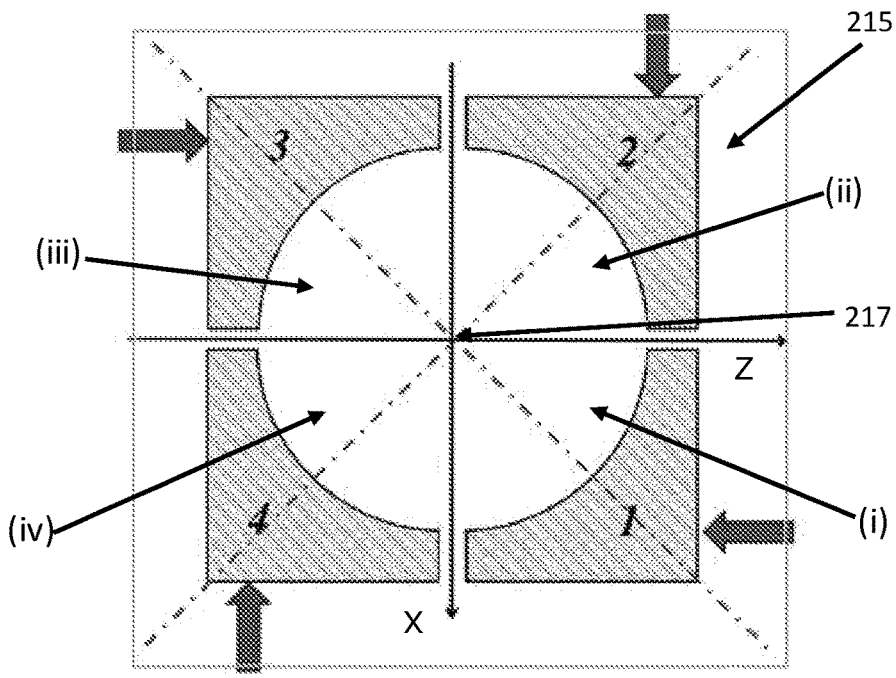
FIG. 2 is a schematic illustration of a transverse cross section of a component of a tunable filter that is calibrated by the device of the present disclosure, according to some examples of the presently disclosed subject matter.

A portion of the depression is formed with stationary pinholes 116 to allow transmission of light from the other side of the base 107, i.e., from the light source, to interact with different parts of the tunable filter. Transmission of light through different stationary pinholes leads to an interaction of the light, e.g., transmission and/or reflection, with different portions of the optical components of the tunable filter. FIG. 2 is a schematic illustration of a transverse cross section of a component/member 215 of the tunable filter showing an example of illuminated portions by transmission of light through different stationary pinholes 116. In this example, the middle stationary pinhole transmits light to the center 217 of the active optical member 215 and each of the peripheral stationary pinholes allows transmission of light towards a different quarter of the optical member (i), (ii), (iii) and (iv).

A moving surface 118 formed with moving pinholes 120 is disposed between the stationary pinholes 116 and the optical assembly holder 102. A driving unit 122 is configured to move the moving surface in a rotational movement, switching between different filtering states of the moving surface (also referred to herein as "light selective states"), where in each filtering state one or more moving pinholes 120 are aligned with the one or more stationary pinholes 116 to allow transmission of light from on side of the base 107 to another side thereof towards selected portions of the optical components of the tunable filter. For example, when an optical assembly is received and held in the optical assembly holder 102, light emitted therefrom is transmitted through a single pair of aligned moving and stationary pinholes, interacting with a specific portion of the optical component of the tunable filter and reflecting back towards the optical assembly. The detection of the reflection of the illumination is analyzed to determine the state of the tunable filter, namely the gap between a stationary and movable optical component.

Therefore, the longitudinal bore 108 of the optical assembly holder 102 is configured such that the optical assembly that is received and held therein is positioned for providing illumination towards the tunable filter, when portions thereof are exposed due to alignment of pairs of pinholes. In this example, longitudinal axis Y aligns with the optical axis of the optical assembly, namely the emitted and reflected light are propagating about along this axis.

As can be appreciated, the movable surface 118 is formed with a plurality of pinholes sets 124A, 124B and 124C. Each set is designed to filter different wavelength band and expose one portion of the tunable filter at a time to the filtered illumination of the light source of the optical assembly. For example, a set includes three moving pinholes, and upon changing a rotational state/position of the movable surface, one of the pinholes is positioned in an alignment with different stationary pinhole such that at each rotational state only a single portion of the tunable filter is illuminated with a light spot. It is to be noted, that in some embodiments, a single moving pinhole may be aligned with two or more different stationary pinholes at different rotation states. Furthermore, each set of moving pinholes may include a unique band-pass filter for filtering desired bandwidth or wavelength of light. For example, the first set may include red filter, the second set a green filter, the third a blue filter and the fourth an IR filter.

In some examples, the moving pinholes 120 are designed to be greater than the stationary pinholes 116, e.g. has a greater diameter, to allow relatively broad placement and assembly tolerance. Therefore, the stationary and the movable pinholes are designed to form a filtering arrangement for filtering illumination of the light source of the optical assembly such that only desired portions of the tunable filter are illuminated at a time.

Figure 3:
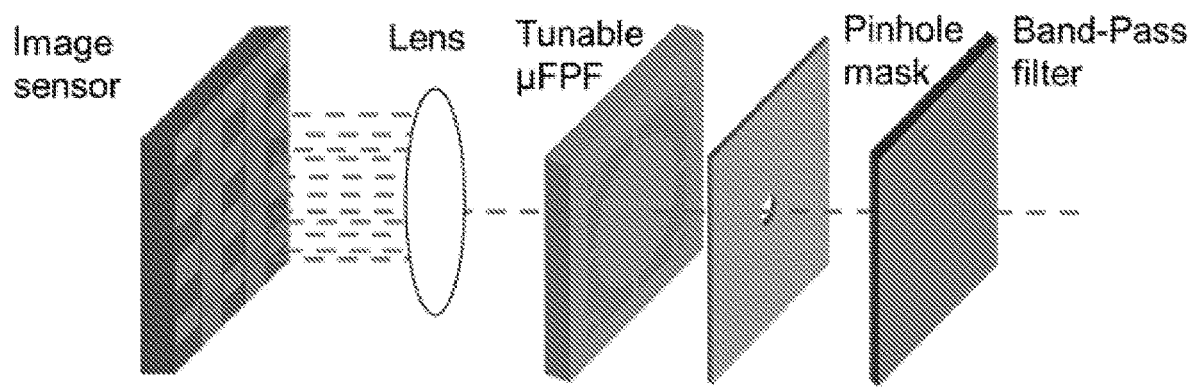
FIG. 3 is a schematic exploded illustration of components of the device with a tunable filter, according to some examples of the presently disclosed subject matter.

FIG. 3 is a schematic exploded illustration of components of the device with a tunable filter that exemplifies an example according to the present disclosure. According to this example, the illuminated light of the light source is filtered by a band-pass filter. For example, the filter may allow only a red, green, blue or specific IR wavelength. The filtered light propagates towards a pinholes mask (light selective unit) that is configured to direct the filtered light towards a desired portion of the tunable filter, e.g. micro Fabry-Perot filter. As mentioned above in some examples filtering is done by a light filter formed as part of a light selective unit. In some examples, the light that is transmitted through the tunable filter is directed by a lens towards an image sensor (e.g., RGB, RGB-IR, monochromatic, etc.) that is configured to sense the spectral response received from the tunable filter, namely the intensity of the filtered light that is transmitted through the tunable filter.

The tunable filter that is calibrated, e.g. a Fabry-Perot filter, has, in some examples, a stationary optical member and a movable member such that the gap between the stationary and the movable member defines the spectral transmission of the illumination, i.e. the transmitted wavelengths and their intensities. Typically, the two members are not perfectly parallel to one another and the specific actuation parameters, which brings the gap to a certain value, differ from one tunable filter to another due to manufacturing tolerances. Therefore, the device of the present disclosure is used to identify the actuation parameters, e.g. electrostatic forces applied by electrodes, that bring the tunable filter to any desired gap and the two members are parallel to one another according to a certain threshold, i.e. a tolerance that permits a certain degree of non-parallelism. The illumination of a single portion of the tunable filter allows to determine the gap between the two members according to the transmitted spectrum, e.g. the reflected or transmitted intensity profile of red, green, blue or IR light.

Figure 3A:
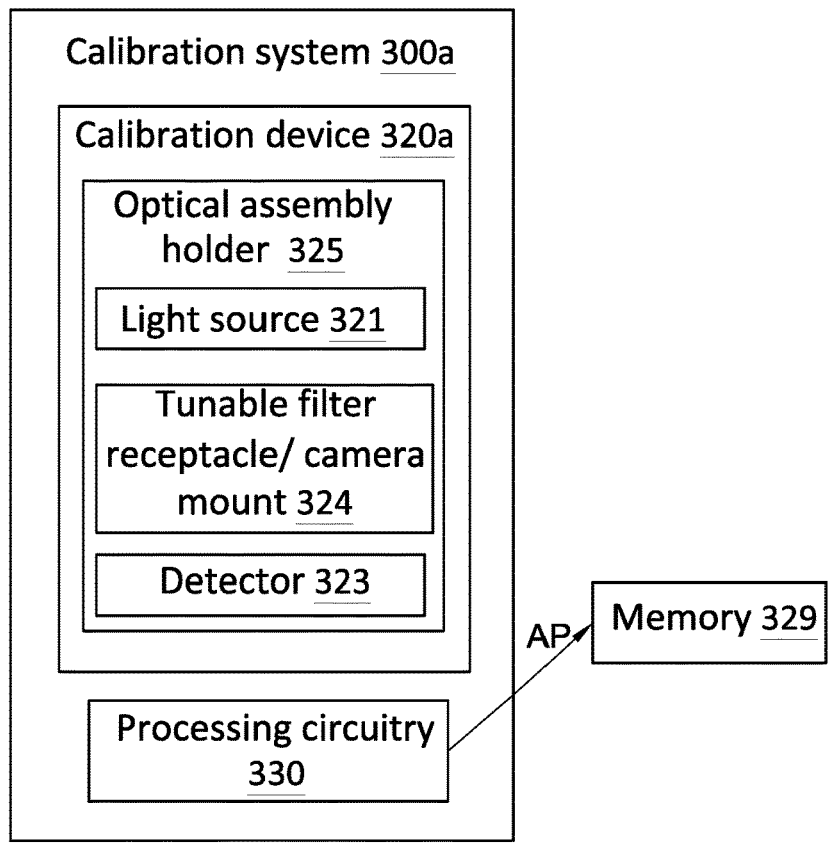
FIGS. 3A-3B are block diagrams schematically illustrating a calibration system, according to some examples of the presently disclosed subject matter.

FIG. 3A is a block diagram of a non-limiting example of a calibration system 300a. Calibration system 300a includes a calibration device 320a e.g., as described above with reference to FIGS. 1A-1E. The system further includes a light source 321 (e.g., collimated light source) and a detector 323 (e.g., image sensor, spectrometer, etc.) that are received by the optical assembly holder 325 of the calibration device 300a and a processing circuitry 330. In some examples, the system further includes a tunable filter receptacle for holding the tunable filter or a camera mount for holding a camera (324).

The processing circuitry 330 is configured to control the execution of various operations including one or more of the following:

(a) applying actuation parameters, e.g. application of different voltages in each of the electrodes, for controlling the state of the tunable filter (e.g., by controlling a moveable member). The state of the tunable filter defines at least one of a gap from a stationary member of the tunable filter, the angular state with respect to the stationary member, e.g. roll, or pitch and defines the optical response of the tunable filter;

(b) controlling the sampling process of each portion of the tunable filter during the iterations in the calibration process, namely switching between states of the light selective unit and driving the moving surface from one state to another;

(c) analyzing optical responses of one or more portions, determining the tunable filter-state based thereon, and determining if the state of the tunable filter satisfies a predetermined condition; and (d) tuning the illumination spectrum of the light source.

These operations enable to determine whether the transmitted central wavelength (CWL) and full-width half max (FWHM) are within the acceptable tolerance. Alternatively, these operations enable to determine whether the tunable filter is in a state that is within the accepted tolerances for gaps between different portions of the tunable filter and/or within the accepted angular tolerances.

Once the tunable filter reaches a state under the accepted tolerances, the actuation parameters AP that brought the tunable filter to the desired state are transmitted to a computer data repository 329 e.g., operatively connected to the tunable filter.

Figure 3B:
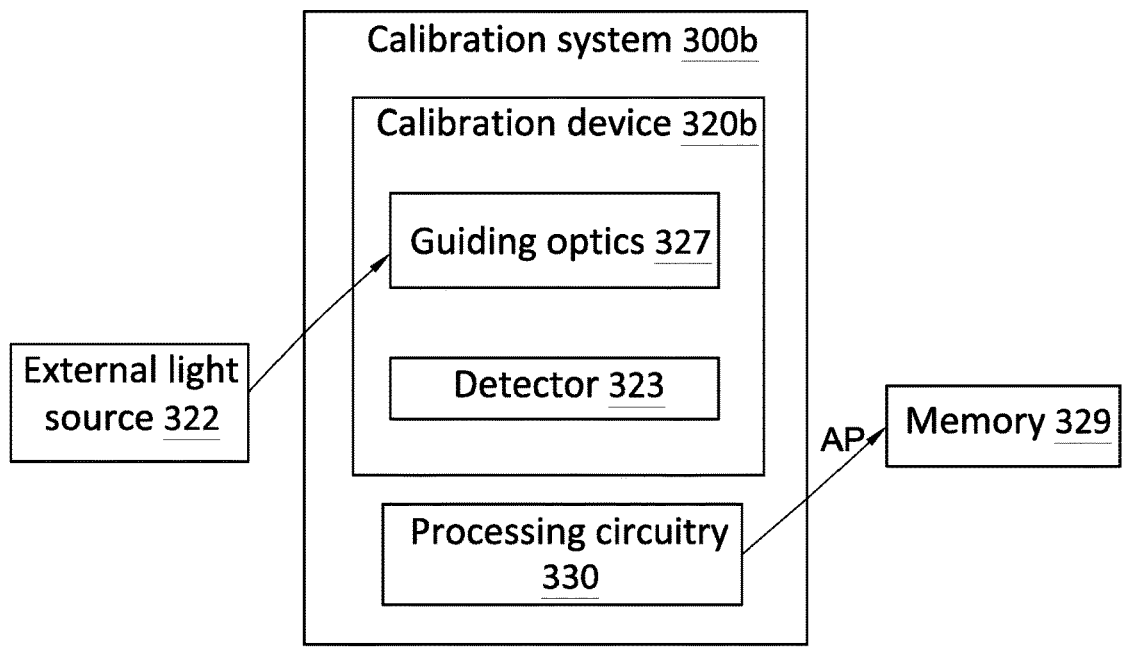

FIG. 3B is another block diagram of a non-limiting example of a calibration system according to an aspect of the present disclosure. In this figure, the calibration system 300b includes a calibration device 320b. The calibration device has guiding optics 327 for guiding light originating from an external light source 321 towards the light detector 323 (e.g., image sensor, spectrometer). The guiding optics can be configured as a light selective unit and possibly also as a light collimator. The processing circuitry 330 is configured to control the execution of one or more of the following: (a) applying actuation parameters, e.g. application of different voltages in each of the electrodes, for controlling the state of a movable member of the tunable filter. The state of the tunable filter defines at least one of a gap from a stationary member of the tunable filter, the angular state with respect to the stationary member, e.g. roll, or pitch and defines the optical response of the tunable filter; (b) controlling the sampling process of each portion of the tunable filter during the iterations in the calibration process, namely switching between states of the driving the moving surface from one state to another; (c) analyzing optical responses of one or more portions, determining the tunable filter-state based thereon, and determining if the state of the tunable filter satisfies a predetermined condition; and (d) tuning the illumination spectrum of the light source. In other words, determining whether the tunable filter is in a state that is within the accepted tolerances for gaps between different portions of the tunable filter and/or within the accepted angular tolerances. Once the tunable filter reaches a state under the accepted tolerances, the actuation parameters AP that brought the tunable filter to the desired state are transmitted to computer data repository 329 that is associated with the tunable filter.

Figure 3C:
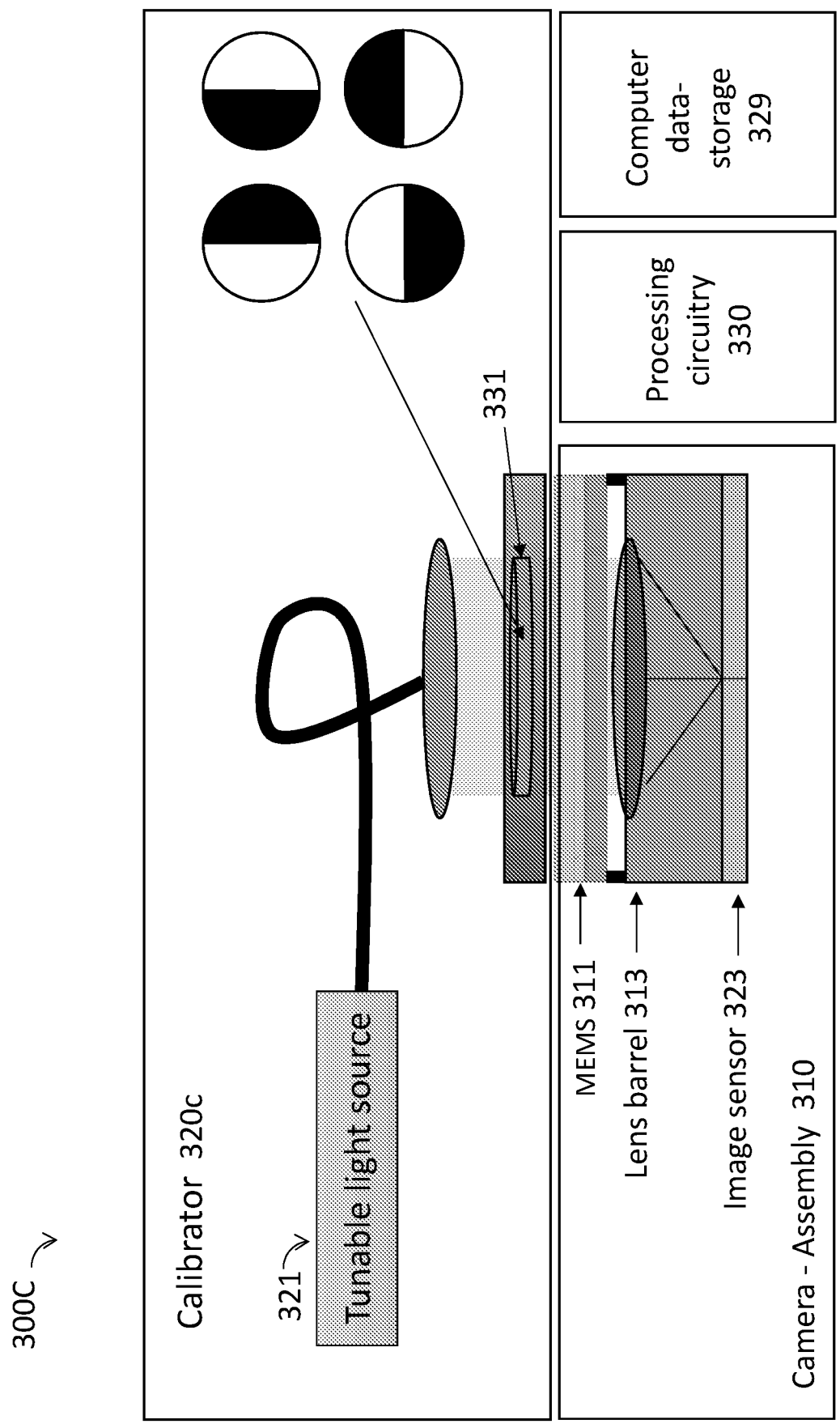
Figure 3E:
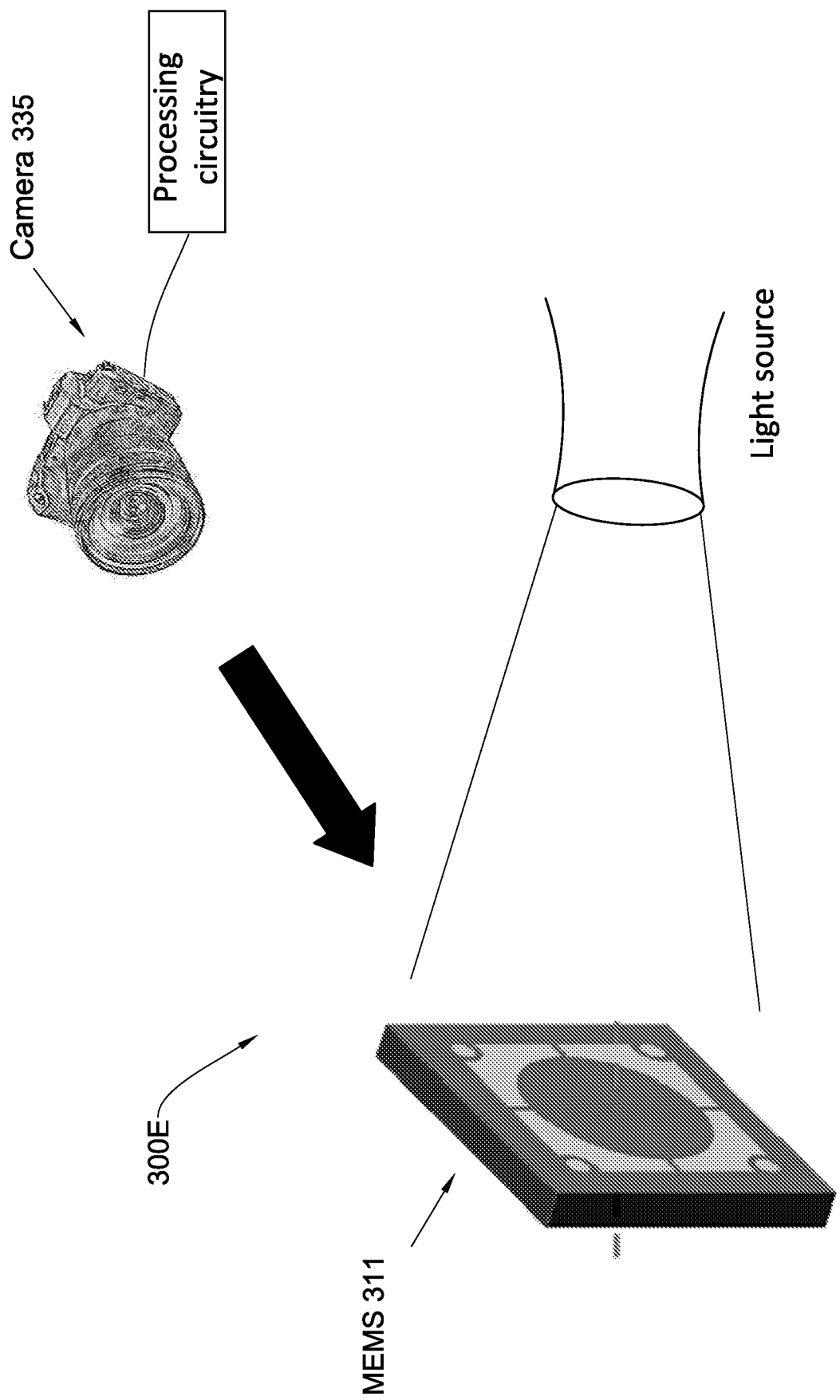
FIG. 3E is a schematic illustration of a calibration system according to another example of the presently disclosed subject matter.

FIGS. 3C-3E schematically illustrate different implementation of a tunable filter calibration system, according to examples of the presently disclosed subject matter. According to one approach a tunable filter (e.g., a MEMS-based Fabry-Perot filter) is calibrated after being assembled in a dedicated device such as a camera, e.g., fixed over a lens barrel as demonstrated schematically in FIG. 3C (also referred to herein as "on-device" calibration). According to a second approach, as illustrated with respect to FIG. 3D, a tunable filter is calibrated as a separate device, before being installed or integrated in some other device, such as a camera (also referred to herein below as "off-device calibration").

FIG. 3C is a schematic illustration of on-device calibration system 300C according to some examples of the presently disclosed subject matter. FIG. 3C shows schematically a calibrator 320c attached to a camera-assembly 310. Camera-assembly 310 can be an actual integrated camera device or a camera model integrated as part of the calibration system, comprising certain camera elements that enable to calibrate the tunable filter as if integrated in an actual camera. According to the latter, a tunable filter is calibrated using the camera-assembly 310 and can be installed in an actual camera after being calibrated. It is noted that the on-device approach is not limited only to tunable filters integrated in a camera and can be likewise applied to other devices that integrate a tunable filter.

The camera assembly 310 comprises a sequence of elements situated along an optical axis, extending from an object side to an image size, comprising tunable filter 311, a lens barrel 313 comprising one or more lens elements and an image sensor 323.

Calibrator 320c comprises a light selective unit 331 and a light source 321, or otherwise operatively connected to a light source. Light source 321 is configured to direct light towards camera-assembly 310 and in some examples is characterized by a given/known illumination profile (a light source with a known illumination spectrum). According to some examples, the light source 321 is a collimated light source. A collimated light source is advantageous as it helps to neutralize the influence of the transmission angle of incidence of light on the tunable filter which may influence the reading of the sensor.

In some examples, calibration system 300C further comprises a camera mount configured for holding camera 310 and/or an optical assembly holder unit (which are not shown) configured for holding light source 321 such that its optical axis is aligned with the optical axis of the camera, e.g., when the camera is being held by the camera mount. In this configuration, the center of the beam of the light source is directed towards the optical axis of the camera, where the tunable filter and lens barrel, are aligned along the same optical axis. In some examples, light selective unit 331 is also placed along the same optical axis such that light illuminated by the light source passes through the light selective unit and a light spot illuminates a part of the surface area of the tunable filter.

According to the example illustrated with reference to FIG. 3C, light selective unit 331 does not comprise a surface with pinholes but rather a light shield configured to block passage of light over an entire region of the tunable filter. As illustrated in FIG. 3C, light selective unit 331 can be configured as a disk fitted to cover the optical aperture of the tunable filter 311, where a region of its surface (herein below "light blocked region") is characterized by a color or other coating, impervious to light, and specifically light illuminated by the light source 321. According to one example half of the surface area of the light selective unit is configured to block the illuminated light and the other half is transparent to light illuminated by the light source. According to another example, the light selective unit is divided into quarters, where two non-adjacent quarters are configured as light blocked regions and the two other quarters are transparent to light emitted by the light source.

According to some examples, the light selective unit 331 is further configured as a band-pass filter allowing passage of light in one or more specific wavelengths (e.g., the filter may allow only a red, green, blue, or specific IR wavelength). According to another example, light illuminated by the light source is filtered by a designated band-pass filter separated from the light selective unit. Light illuminated by the light source propagates towards the light selective unit, which blocks part (e.g., half) of the light beam and allows the other half to pass and enter the lens barrel. Light passing through the lens barrel is focused by the lens into a light spot that illuminates a portion of the image sensor. The image sensor (e.g. RGB, RGB-IR image, monochromatic, etc.) is configured to sense the spectral response received from the tunable filter, namely the intensity of the light that is transmitted through the tunable filter.

The light selective unit 331 is configured to be rotated (e.g., in a planner movement around its center) relative to the tunable filter, where each rotation results in a respective state of the light selective unit (herein below "light selective state") and where in each state the light selective unit 331 blocks passage of light over a different area of the tunable filter. For example, in case half of the surface area of the light selective unit is light blocked, each state can be defined by a 45° rotation or a 180° rotation of the light selective unit (giving rise to 4 light selective states or 2 light selective states, respectively).

According to examples of the presently disclosed subject matter, while the tunable filter 311 is being illuminated by the light source the light selective unit is rotated to assume different light selective states, where in each state the optical response of the image sensor is detected, namely the transmission or reflection from the region (e.g., half) that is illuminated with light.

Calibrator 320c can further comprise or be otherwise operatively connected to a processing circuitry 330 configured to execute operations as described above with reference to FIGS. 3A and 3B. For example, processing circuitry can be configured to compare between optical responses received in different light selective states and in case variations between the optical response exceed a certain acceptable tolerance, to apply updated actuation parameters for adapting the optical gap and tilt angles and bringing the state of the tunable filter to the desired condition (e.g., a desired state). Specifically, the comparison allows to reduce variations and obtain a more uniform optical response over the entire area of the tunable filter and obtain a narrow FWHM and an accurate CWL in the transmission spectra of the tunable filter. Comparison and update of the actuation parameters can be executed repeatedly until variations between the optical responses at different light selective states is within some acceptable range. Once the tunable filter reaches a state under the accepted tolerances, the actuation parameters AP that brought the tunable filter to the desired state are transmitted to a computer data repository 329 e.g., operatively connected to the tunable filter. A more detailed description of examples of a calibration process executed by processing circuitry 330 is described below with reference to FIGS. 7a and 7b.

FIG. 3D is a schematic illustration of off-device calibration system 300D according to some examples of the presently disclosed subject matter. FIG. 3D shows a sorter 320d comprising light source 321 similar to the light source described above with reference to FIG. 3C. The sorter is operatively connected to a processing circuitry 330 and a computer data-repository as described above with reference to FIG. 3C. The sorter is further operatively connected to a filter-assembly 340 comprising a detector 323 (e.g. image sensor) and configured to received and hold a tunable filter 311 (e.g. MEMS Fabry-Perot) during calibration.

The light source is configured to illuminate the tunable filter device and the image sensor (e.g. RGB, RGB-IR, monochromatic, etc.) is configured to sense the spectral response received from the tunable filter, namely the intensity of the filtered light that is transmitted through the tunable filter.

According to an example in the off device approach a light selective unit is not used. Rather the surface area of an image sensor 323 is divided into sub-regions and the spectral response received by each sub-region is integrated to obtain a respective value. As before, the system comprises or otherwise operatively connected to a processing circuitry 330 configured to compare between the set of values, each integrated over a respective sub-region of the sensor, and in case variations between the values which are greater than a certain threshold is determined, to apply updated actuation parameters for adapting the optical gap and bringing the state of the tunable filter to the desired condition as explained above with respect to FIG. 3C. Division of the image sensor surface area can be applied repeatedly, where in each iteration the division is applied on a different dimension of the image sensor. In case division into sub-regions is implemented by dividing the surface area into two halves, in one example, two divisions can be obtained, one across a first dimension and the other across the other dimension. In some examples additional divisions can also be applied, e.g., dividing the sensor along its diagonals. Comparison and update of the actuation parameters can be executed iteratively until variations between the optical response at different light selective states is within some acceptable range. Once the tunable filter reaches a state under the accepted tolerances, the actuation parameters AP that brought the tunable filter to the desired state are transmitted to a computer data repository 329 e.g., operatively connected to the tunable filter.

FIG. 3E shows another example of a calibration system 300E. Calibration system 300E includes a tunable filter-sensor assembly configured to receive and hold a tunable filter 311 (e.g., MEMS Fabry-Perot). The assembly further comprises or is otherwise operatively connected to a light source 321 similar to the light source described above with reference to FIG. 3a. According to some examples, the tunable filter is integrated in a device such as a camera during calibration.

The light source is configured to illuminate the assembly, whereas mentioned above in some examples, the light illuminated by the light source is filtered by a band-pass filter allowing passage of light in one or more specific wavelengths. The filtered light propagates through the filter towards the image sensor, which is configured to sense the spectral response received from the tunable filter, namely the intensity of the filtered light that is transmitted through the tunable filter.

System 300E according to this example further includes a camera 335 directed towards the tunable filter and configured to capture images of the tunable filter surface, while the tunable filter is being illuminated by the light source. The captured images are processed by a processing circuitry, configured to identify interference fringes caused by the interference of the tunable filter. Interference fringes, which are caused when the two mirrors of the tunable filter are parallel are observed as a symmetrical circular shape around the center of the tunable filter. On the other hand, in case the mirrors are not parallel, the observed interference fringes are in offset from the center. FIGS. 8A and 8B are a pictures of a Fabry-Perot tunable filter, taken during illumination of the filter from top view, i.e. where the image sensor is directed in a substantially vertical angle relative to the surface of the filter.

FIG. 8a shows an image of an uncalibrated Fabry-Perot tunable filter, where the interference fringe 10 is clearly visible. FIG. 8b shows an image of a calibrated Fabry-Perot tunable filter, where the interference fringe is aligned with the edges of the optical aperture of the tunable filter and accordingly is not discernible in the image or viewed as complete ring encircling the aperture concentric to its edges.

The processing circuitry 330 is configured to process images captured by the camera and in case the interference fringe is detected, to apply updated actuation parameters for adapting the optical gap and bringing the state of the tunable filter to the desired condition. Following the update to the optical gap, one or more additional images are captured by the camera and processed to determine whether the newly applied actuation parameters provide the desired result. These operations can be repeated until the interference fringes are symmetrically aligned around the center of the tunable sensor. Notably, in some examples machine learning algorithms can be applied during the image processing for identifying an image that represents a desired optical state. Once the actuation parameters for obtaining the desired optical state are determined they can be stored in a computer storage device for future reference.

Figure 4:
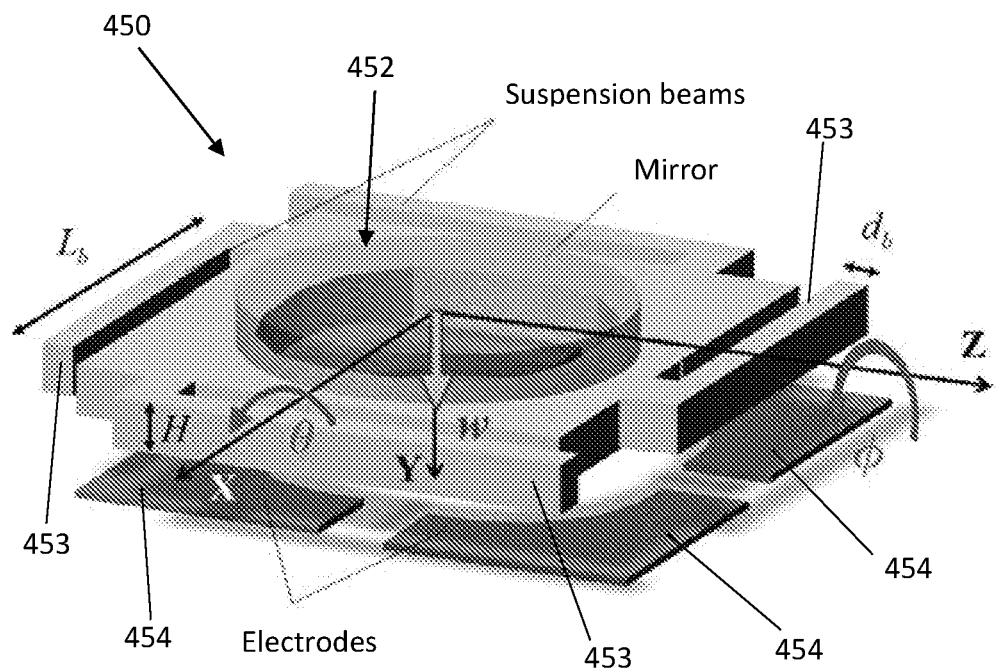
FIG. 4 is a schematic illustration of a perspective view of a part of a Fabry-Perot filter, which includes the movable member and its associated electrodes. This kind of Fabry-Perot may be received by the tunable filter receptacle of the device of the present disclosure for calibration, according to some examples of the presently disclosed subject matter.

FIG. 4 is a schematic illustration of an example, in perspective view of a part of a Fabry-Perot tunable filter, which includes the movable member and its associated actuators (e.g., electrodes), that is adapted to be received by the tunable filter receptacle of the device of the present disclosure for calibration. The number of actuators can be 3 or more. The movable member 450 includes an optical member 452 formed in its middle part. The optical member 452 is in the form of a mirror having optical coatings and the gap between the optical member 452 of the movable member 450 and another optical member (e.g., stationary; not shown) defines the transmitted/reflected spectrum. The movable member 450 is configured to move due to being suspended on flexible suspension beams 453. The movement is performed according to application of electrostatic forces between actuation regions formed on the movable member 450, e.g., regions of doped silicon, and their respective electrodes 454. The existence of four electrodes allows to move the movable member along a vertical axis Y at a vertical amount w and around axes X and Z, namely rotating at angles $\theta$ and $\phi$, respectively. It is to be noted that these movements can be obtained by only three electrodes. A linear combination of the electrostatic force applied by each pair of electrodes, namely the voltage difference between the electrode on the movable member and its respective electrode, may result in any desired movement, either a combination of vertical and rotational movements or an isolated vertical or rotational movement.

FIGS. 5A-5D are graphs exemplifying the expected quantum efficiency (QE) profile in an image sensor in dependency of the tunable filter's state, i.e., the optical gap between the optical members. FIGS. 5A-5D show the transmission functions of the tunable filter for specific wavelengths—red 610 nm (5A), green 510 nm (5B), blue 485 nm (5C) and IR 800 nm (5D), respectively, values are given in a form of QE detected by a given image sensor. It is to be noted that these values may be adjusted according to the selected image sensor. When using transmission-based calibration technique, according to an example of the present disclosure, the transmitted light through the tunable filter is detected by an image sensor and is expected to exhibit for each wavelength the respective transmission function/intensity profile of the transmission. According to the expected profile, the measured intensity may indicate the desired state of the tunable filter.

Figure 5A:
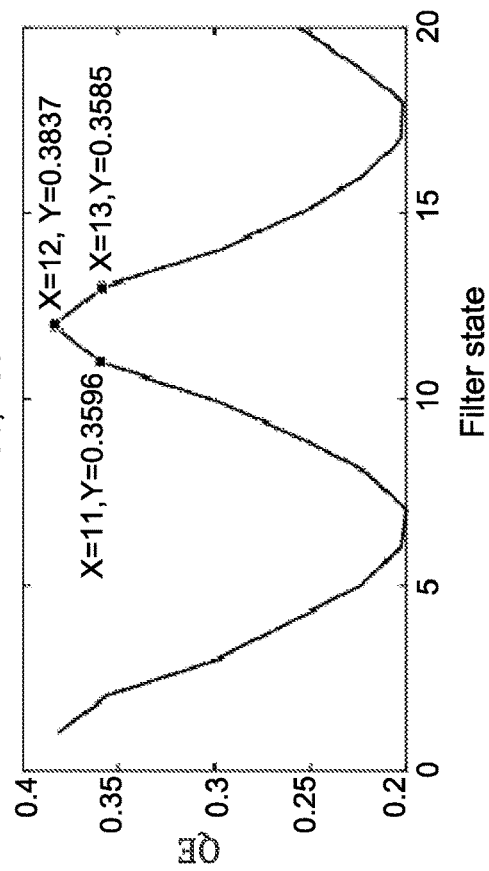
FIGS. 5A-5D are graphs exemplifying the expected reflected intensity profile from the tunable filter according to the tunable filter's state, i.e. the optical gap between the optical members, according to some examples of the presently disclosed subject matter.
Figure 5B:
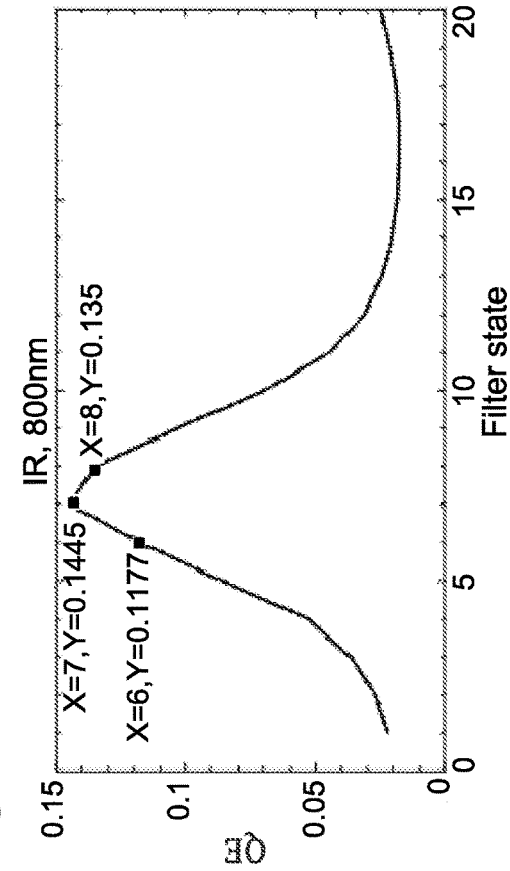
Figure 5C:
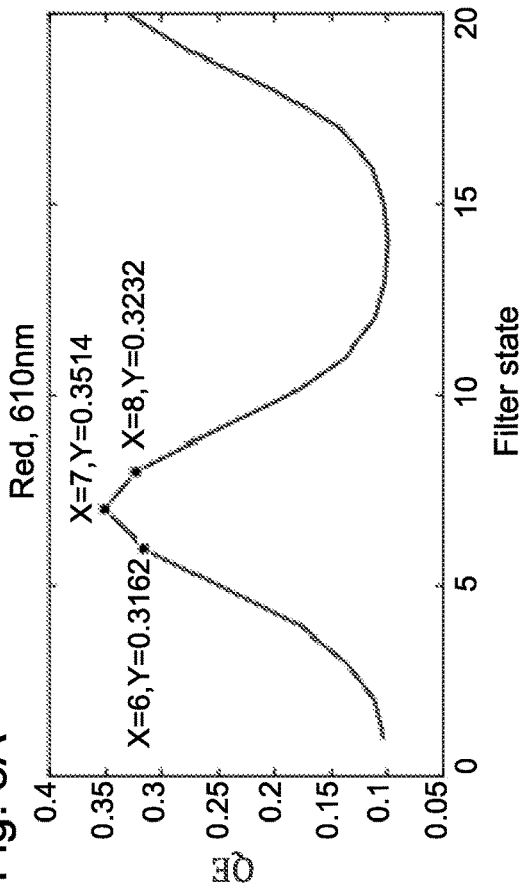
Figure 5D:
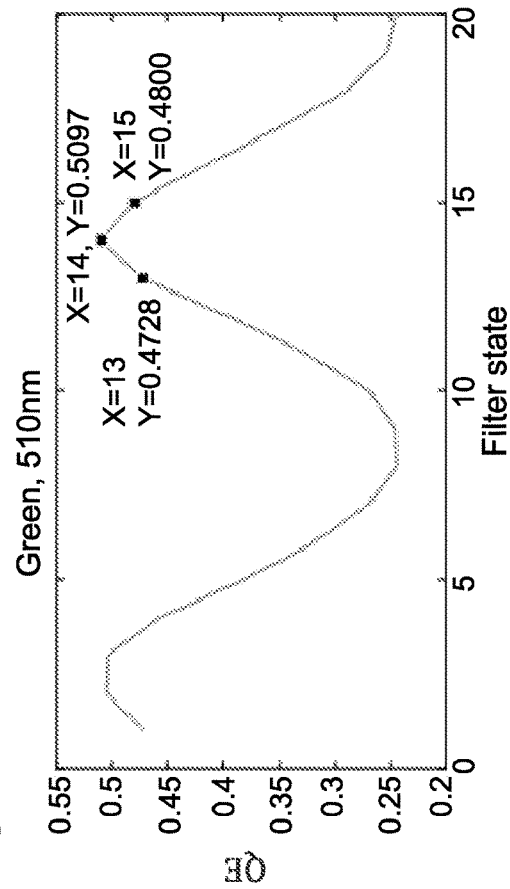

For example, by using red light having wavelength of 610 nm, a peak of intensity is expected to be exhibited when the optical gap is between states 5 to 10 (as shown in FIG. 5A), each state represents a specific optical gap. The estimated actuation parameters for obtaining this gap are applied in each selective unit state, and an iterative process is initiated to determine the exact actuation parameters that bring all portions of the tunable filter to the desired gap (within the accepted tolerances), namely to a peak of transmitted intensity. Once the exact actuation parameters are determined, they are saved in a (computer data-repository device) to allow future actuation to this desired gap by applying them. This technique practically uses a known transmission function of a certain wavelength and the processing circuitry of the system operates the tunable filter for bringing it to a state in which the transmission of the respective wavelength matches the known transmission profile, e.g. a maximum/minimum point of transmission or any recognizable profile in the transmission function. It is to be noted that any recognizable profile in the graphs presented in FIGS. 5A-5D may be used to identify the optical gap between the two optical members using the device of the present disclosure.

Figure 6A:
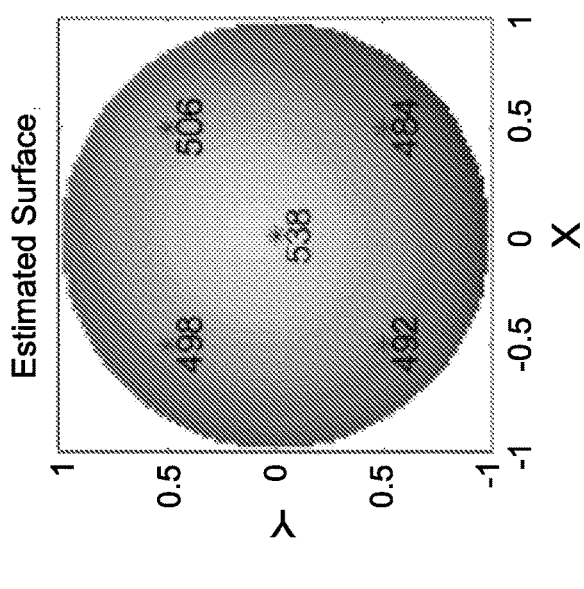
Figure 6A:
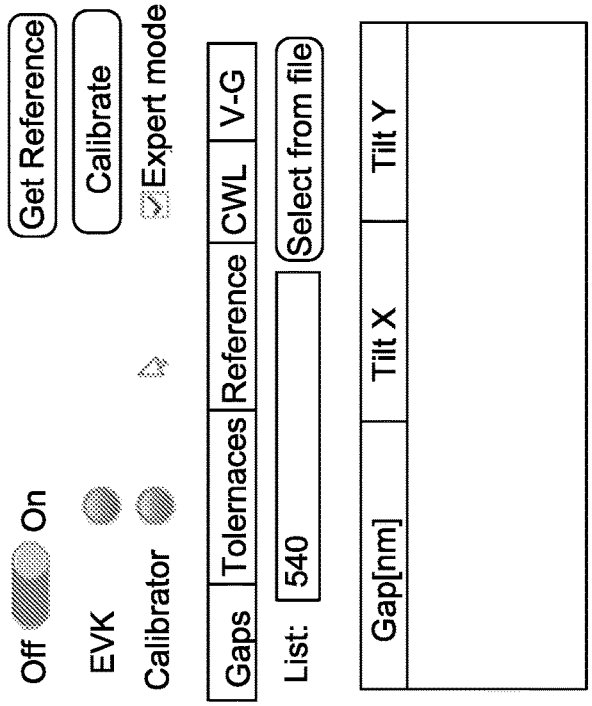

FIGS. 6A-6B are non-limiting examples of a user interface of a software being used to calibrate a tunable filter by the device of the present disclosure. FIG. 6A shows an interim phase of the calibration process. In this example, the actuation parameters of an optical gap of 540 nm are desired, namely the required voltages that need to be applied by four different electrodes of the device in order to obtain a relatively equal gap of 540 nm between a movable optical member and the stationary optical member of the tunable filter. Initial actuation parameters are applied to bring five measured portions, one in the center and four in the periphery of the filter, to the expected desired optical gap in each portion, which is practically expected desired optical gap along a vertical axis and tilts with respect to horizontal axes that are normal to the vertical axis defining the optical gap. The iterations for reaching the desired optical gap stop upon reaching an accepted tolerance, e.g., up to 1 nm difference from the desired gap (540±1 nm) and up to 3 microradians in the tilt angles.

It is be noted that the process can be set such that a specific portion, e.g., the central portion, is required to be at the specific desired optical gap and the tolerances apply only to the other peripheral portion. In other words, these iterations are to bring the tunable filter to an accepted tolerance of angles θ and ϕ, namely tilt with respect to X and the tilt with respect to Z, respectively, in addition to the desired tolerance with respect to the gap along axis Y, as defined in FIG. 4. The upper-right corner of the FIG. 6A shows the last sample of five different portions of the tunable filter, the left-bottom portion of the image shows the applied voltage of each electrode in each iteration, and the right-bottom portion of the image shows the error in each of the parameters—central gap, θ and ϕ. FIG. 6B shows the final phase of the calibration process in which the final iteration brought the device to exhibit a state which is under the accepted tolerances. The voltages applied in each electrode to bring to this desired state are saved in a memory to be used when actuation of the device to this state is required.

Figure 7A:
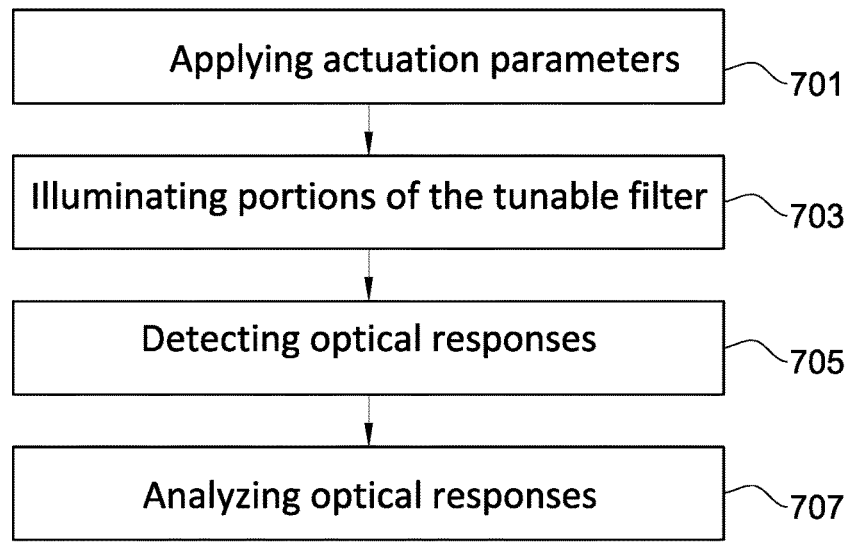
FIGS. 7A-7B are flow diagrams of non-limiting examples of a method for calibrating a tunable filter according to some examples of the presently disclosed subject matter.
Figure 7B:
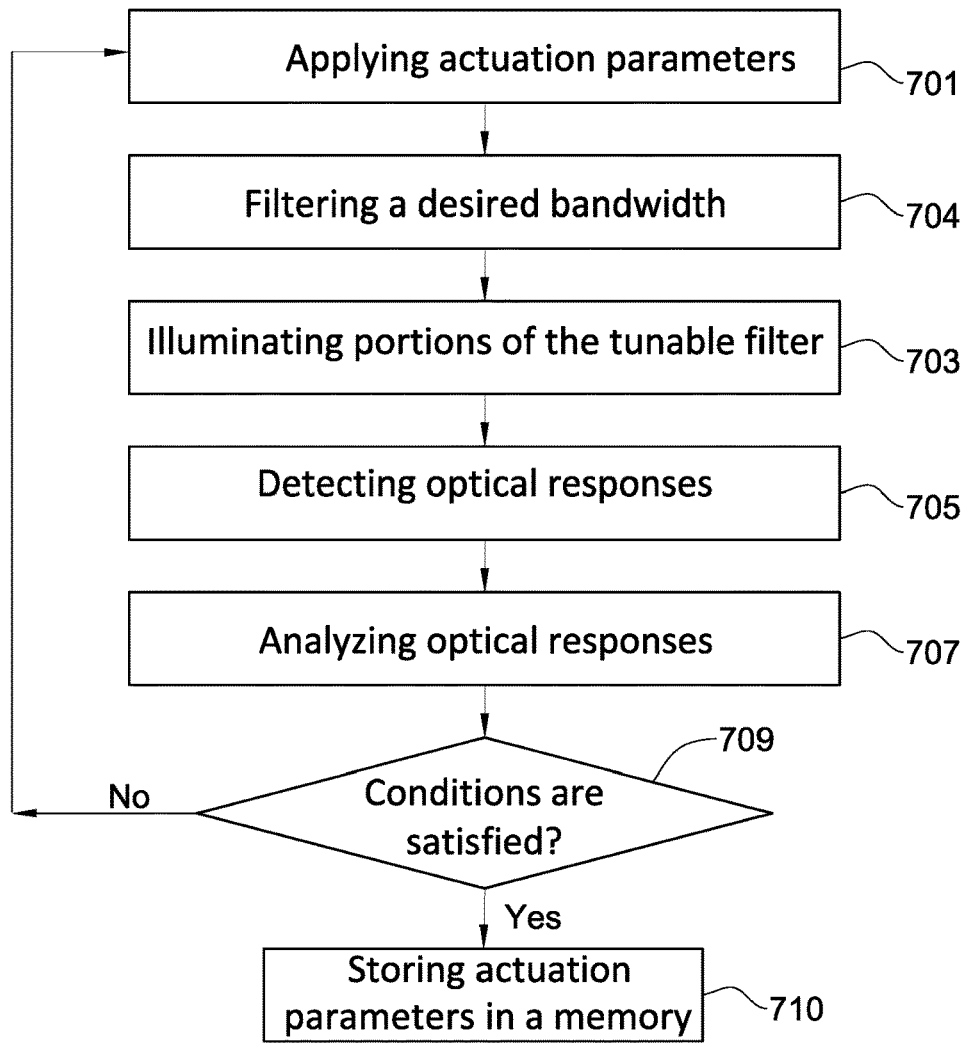

FIGS. 7A-7B are flow diagrams of non-limiting examples of a method for calibrating/adjusting a tunable filter. The method according to FIGS. 7A and 7B can be applied using for example the various calibration systems described above with respect to any one of FIGS. 3A-3D. As mentioned above the calibration systems which are disclosed according to the Figures above include or otherwise operatively connected to a processing circuitry, configured to execute, and control the calibration process. According to some example the processing circuitry is configured to execute various operations described with reference to FIGS. 7A and 7B. As indicated above, the filter includes movable member and an additional member (movable or static), and a plurality of at least three actuators (e.g. three four or more actuators which may be for instance implemented as electrostatic actuators) which are adapted for controlling a state of the tunable filter, by actuating a relative position of the movable member relative to the other/static member. Generally, in some examples the actuation parameters of the tunable filter include a number N of at least three actuation parameters $[V_1, V_2, \ldots V_N]$ (e.g. voltages), which are associated with, or applied to, the at least three actuators of the filter respectively. The state of the tunable filter, in response to actuation thereof, can be characterized by at least the following geometric parameters of the gap between the movable member and the other/static member: (i) the size co of gap being the nominal distance between the filter members (e.g. the average distance between them or the distance between centers thereof); (ii) the relative lateral orientation angle θ; and (iii) relative lateral orientation angle ϕ orthogonal to orientation angle θ. Generally, the method includes: illuminating the filter at a plurality of different spatial portions thereof (e.g. at least three positions/corners thereof enabling to asses the respective distances between movable and other members at said positions based on the filter response from said positions); accordingly detecting a plurality of at least three optical responses obtained from said different spatial portions of the tunable filter; determining updated actuation parameters for operating the plurality of actuators to adjust the state of said tunable filter towards a desired state (whereby such determination is based on the feature that the detected optical responses is indicative of the state of the tunable filter (e.g. indicative of the geometric parameters of the gap.

It should be noted that the tunable filter does not necessarily include 4 actuators, but may include at least three actuators by which the angles θ and ϕ as well as the gap w can be independently controlled. Accordingly, the actuators may be associated with three or more respective actuation voltages $V_1$ to $V_3$ and as will be readily appreciated by those versed in the art, the below equations may be likewise implemented with for said three actuations voltages. It should be also understood that the tunable filter may be implemented with more than 4 actuators and accordingly more than 4 respective actuation voltages will used/calibrated to set the tunable filter state.

FIG. 7A describes a method that optionally includes applying actuation parameters 701 to a tunable filter for setting it in a desired state. Since the exact actuation parameters for bringing the tunable filter to the desired state are unknown prior to the calibration process, estimated parameters are applied that bring the tunable filter to about the desired state. Portions of the tunable filter are then individually illuminated 703 by a light source, e.g., a central portion and several peripheral portions (as demonstrated above with respect to FIG. 2), and the optical responses of the interaction of illumination with the portions, i.e., transmission or reflection, are detected 705, giving rise to a set of optical responses. Each optical response in the set obtained from illumination of a respective portion and is indicative of geometrical parameters characterizing the gap between members of the tunable filter (e.g., tilt of movable member relative to stationary member). The optical responses in the set are analyzed 707 to determine whether the tunable filter satisfies a predetermined condition, e.g., acceptable tolerance of variation of the optical responses between the different portions. As mentioned above, in some examples, where a light selective unit is used, the processing unit can be configured during the illumination stage, to drive the light selective unit so it is switched between light selective state, where in each state a different portion of the tunable filter is illuminated by the light source.

It is noted that in some examples more than one portion can be illuminated simultaneously. This can be done for example by using different wavelengths for illuminating different portions and normalizing the optical response of the different wavelengths. To this end the light source can illuminate with white light and a light selective unit configured to illuminate more than one portion of the tunable filter at once is used (e.g., the light selective unit can be used to illuminate the tunable filter using more than one pinhole simultaneously), where the light selective unit is configured to filter the white light using different filters applied over different portions of the tunable filter, thus providing different light beams of different wavelengths, each directed by the light selective unit to a different portion of the tunable filter.

FIG. 7B shows additional features of the method described with respect to FIG. 7A. Analysis according to block 707 includes comparison between optical responses in the set obtained by the different illuminated portions of the tunable filter and determining whether the tunable filter satisfies a predetermined condition. If there is a difference between optical responses in the set which is greater than a certain acceptable threshold (tolerance) 709, the actuation parameters are updated, and the process reverts to block 701, giving rise to a new set of optical responses, as before each optical response in the set obtained from illumination of its respective portion. This cycle is repeated until the actuation parameters provide optical responses which comply with predetermined conditions, namely optical responses which are within the acceptable tolerance. Once the predetermined conditions are met, the actuation parameters, e.g., the applied voltages in each electrode of the tunable filter, are stored in a computer data-repository 710.

It is noted that the desired actuation parameters are those which provide a desired condition of the tunable filter (e.g., desired state), namely a uniform optical response across the entire tunable filter. However, the optical response received by illuminating different portions of the tunable filter depends on parameters including the expected geometry of the tunable filter in the calibrated state and the relative location of the respective illuminated portion on the tunable filter (e.g., relative to the center). For an expected geometry in a calibrated state of a tunable filter, the ratio of the required optical response measured at different illuminated portions (at different light selective states) can be derived from the geometry. For axisymmetric geometry (e.g., bow shaped), the ratio between optical response of illuminated portions located at equal distance from the center, is expected to be 1 (or close to 1 within the acceptable tolerance), whereas the ratio between the optical response of illuminated portion located at different distances from the center, is proportional to respective distance from the center. Thus, is should be understood that the predefined condition(s) applied for the comparison between the optical responses obtained by respective isolated illuminations of specific portions of the tunable filter as described herein takes into consideration parameters, including the expected geometry of the tunable filter in the calibrated state and the relative location of the respective illuminated portion on the tunable filter.

The method described in FIG. 7B further includes an optional operation of filtering a desired bandwidth of the illumination 704, such that a narrow band of light interacts with the tunable filter and provides an optical response. For example, the filtering may result in that only red, green or blue light are reaching the tunable filter.

Comparison between different optical responses, can be performed in several ways. According to one example, the actual optical responses are compared. This can be done by comparing between the illumination profile (e.g. spectrometer readout) of the different illuminations. According to other examples, some derivative of the optical response can be compared instead. One example of an optical response derivative is the integrated or average intensity value received in a certain light selective state. Another example of an optical response derivative is the physical gap which can be deduced from the optical response. For example, a lookup table (stored for example on a storage device accessible to the processing circuitry) associating between the optical response/illumination profile and the respective physical gap can be used. Alternatively, other functions of the optical response can be applied and used during the comparison.

Another example for the technique of the invention for calibrating/adjusting a tunable filter includes the comparison between a desired state $X_{set}$ and an actual state of the tunable filter, where each of the states, is derived from a function applied to a set (or subset) of optical responses, each obtained from a respective illumination of a portion of the tunable filter.

For example, as indicated above the state of the filter can be defined as a vector (expressed by x in equation 1 below) having entries of the central gap $\omega$ and two tilt angles, $\theta$ and $\phi$. Typically in a desired state of the filter the central gap $\omega$ is set to a value derived from the required CWL and the tilt angles are generally set to 0 (so that the filtration properties resulted from different spatial portions of the filter would be similar).

$$x_4 = \begin{pmatrix} w \\ \theta \\ \phi \end{pmatrix} = F_1(w, \theta, \phi) F_2(V_1, V_2, V_3, V_4) \qquad \text{Equation 1}$$

Here $F_2$ is the vector of the actuation parameters, which may for example take the following form:

$$F_2(V_1, V_2, V_3, V_4) = \begin{pmatrix} V_1^2 \\ V_2^2 \\ V_3^2 \\ V_4^2 \end{pmatrix}$$

Here V1-V4 exemplify the actuation voltage at the measured state.

It is noted that in some implementations as few as three actuation voltages or more than four, may be used to adjust the filter and a person of ordinary skill in the art would readily appreciate how to adjust the above and below equations to the specific number of actuators.

In Eq. 1, the function (matrix function) F1 represents a model of a general filter of a type of the tunable filter which is to be adjusted/calibrated. The model F1 is indicative of the estimated resulting state X of the filters of this type in response to actuation of thereof with the respective set of actuation parameters, exemplified here as V1-V4. Indeed, as would be readily appreciated, in practice actual filters of the similar type, often deviated from the expected estimated resulting state X provided by such model (e.g., this may be due to manufacturing variations and tolerances yielding practical differences between filters of the same type).

A. Utilizing the Model for Setting an Initial-PreCalibration-State of the Filter Nonetheless, such model provides a good estimate for setting an initial state for the calibration of the filter. Accordingly, some implementations of the calibration/adjustment of the filter according to the present invention include:

a) Provision of such model $F_1$ (w, $\theta$, $\phi$) of the filter type (e.g. the model may be stored in memory of the system or be accessible remotely); and utilization of the model for carrying one the following for setting an initial actuation state of the filter with an initial set of actuation parameters, prior to the calibration;

b) Using the model to determine/estimate, the initial set of actuation parameters (here as V1-V4) based on the desired state $X_{set}$ for which the filter should be tuned (e.g. this may be achieved by implementing the invers of $F_1$ on the desired state $X_{set}$ to determine the vector of actuation parameters $F_2$; and c) Setting the initial pre-calibration operation of the tunable filter, with the estimated parameters, so calibration process becomes shorter and/or more efficient.

The model F1 may be for example a matrix function of the geometrical parameters of the filter (w, θ, φ) taking the following form:

$$F_1(w, \theta, \phi) = \begin{pmatrix} \hat{f}_{w,1} & \hat{f}_{w,2} & \hat{f}_{w,3} & \hat{f}_{w,4} \\ \hat{f}_{\theta,1} & \hat{f}_{\theta,2} & \hat{f}_{\theta,3} & \hat{f}_{\theta,4} \\ \hat{f}_{\phi,1} & \hat{f}_{\phi,2} & \hat{f}_{\phi,3} & \hat{f}_{\phi,4} \end{pmatrix}$$

It should be noted that in some embodiments the compliance matrix F1 and F2 are derived from the analytical electrostatic model of the filter. Moreover, it should be noted that in this example the compliance function of the tunable filter is independent of the actuation parameters.

B. Utilizing the Model to Determining the Incremental Corrections During Calibration Iterations:

Alternatively, or additionally, and apart from whether the model is used or set the initial pre-calibration state of the filter. The model F1 may be used according to embodiments of the present invention, to determine the required incremental corrections for the actuation parameters, exemplified (e.g. V1-V4) so that proper calibration/adjustment of the filter is achieve more efficiently (e.g. with less/reduced calibration iterations). In this connection considering the definition G2=dF2/dV, it follows from Eq. 1 that:

$$dx = F_1(w, \theta, \phi, c_i) G_2(V_1, V_2, V_3, V_4) dV \qquad \text{Equation 2:}$$

Equation 2 is a derivative model which is derived from the model expressed by equation 1 enabling to assess change in he activation parameters V required for achieving a desired change in the state (stated vector X) of the filter.

The position/state error e of the filter may be defined as the difference between the state of the filter as measured by the optical responses during the calibration (e.g. during a certain calibration iteration), and the desired stated vector X may be defined as follows: $e = dx = X_{set} - X$.

The inventors of the present invention have understood that considering the model F1, the required correction of the actuation parameters (voltage adjustment) can be obtained (e.g. numerically) from equation 3:

$$dV = (F_1(\omega, \theta, \phi) G_2(V1, V2, V3, V4))^{-1} dx \qquad \text{Equation 3:}$$

For example V' (adjusted voltage) is equal to V+K*dV. Where in one example K is a constant.

Therefore in view of the above, in some implementations the method of the present invention includes providing the model F1 indicated above (or a derivative thereof) and utilizing the model $d = X_{set} - X$ during one or more calibration iterations to determine the updated actuation parameters for the next iteration, based on the preceding actuation parameters, by carrying out the following:

a. utilizing the model (e.g. Eq. 3 above) to determine incremental correction dV to the preceding actuation parameters V of the tunable filter based on the position error is e=dx; and b. updating the actuation parameters V based on the previous actuation parameters V and the incremental corrections dV: V->V+dV C. Efficient Determination of the Incremental Corrections During Calibration Iterations not Relying of a Model:

Yet alternatively or additionally, it should be noted that in some embodiments of the present invention the incremental corrections for the actuation parameters may be efficiently determined also without relying of a model of the filter. This may be for example achieved by the following:

(a) Presenting/transforming the actual actuation parameters $[V_1, V_2, \ldots V_N]$ of the actuators of the filter as a diagonalized sets of three actuation parameters $[V_\theta, V\phi, V_w]$ being formed as a predetermined linear combination of the actual actuation parameters $[V_1, V_2, \ldots V_N]$, such that linear combination by which the diagonalized sets of three actuation parameters $[V_\theta, V\phi, V_w]$ is characterized in that a change in each of the diagonalized actuation parameters $[V_w, V_\theta, V\phi]$ affects a respective change in a corresponding one of the geometric parameters ω, θ and φ, while substantially not affecting a change in other ones of said geometric parameters;

(b) then processing the optical responses from the filter to determine the present state X of the tunable filter in terms of the geometrical parameters $X = \{\omega, \theta, \phi\}$; and (c) determining the desired incremental correction dV for the diagonalized actuation parameters based on a difference between said present state and the desired stated of the tunable filter, thereby yielding a set of corrected diagonalized actuation parameters;

(d) finally, determining the correction for said at least three actuation parameters $[V_1, V_2, \ldots V_N]$ according to the set of the corrected diagonalized actuation parameters;

Considering the above discussion it should be understood that, calibration of the tunable filter includes two aspects; one is related to determining actuation parameters which when applied result in alignment of the tunable filter elements (e.g., alignment between movable and stationary elements), providing an optical response over the entire tunable filter which is uniform as much as possible, and the other is related to identifying actuation parameters which maximize the transmission at a required CWL.

According to a first approach, calibration can be performed with two separate sub-processes, one designated for the first aspect and the other to the second aspect, while according to a second approach, calibration can be performed with a single process which addresses both aspects of calibration. An example of the second approach is described above with reference to equations 1-3.

According to the first approach, the process of alignment of the tunable filter can be followed by a peak detection process. According to one example, alignment of the tunable filter is performed as described above with reference to FIG. 7, however, where the tunable filter is illuminated with a light having a specific narrow band wavelength e.g. red, green, blue, etc., thereby obtaining the calibration parameters needed for aligning the tunable filter in the respective filter-states. This process can be repeated with different wavelengths providing a set of actuating parameters for aligning the tunable filter in different filter-states, i.e., while being illuminated by a respective wavelength. In order to determine the actuation parameters that provide the peak optical response at each wavelength (e.g. peak transmission or reflection) one of the following can be performed:

I.
    a. The central portion of the gap can be adapted while illuminating with light in a certain wavelength, and the optical response can be monitored until the peak optical response in the respective wavelength is achieved.
    b. Following identification of the peak CWA, the alignment process can be repeated (FIG. 7) to ensure that the alignment of the tunable filter was not impaired by the peak calibration.
    c. In case, it is determined that the alignment was impaired, the alignment calibration is repeated in the vicinity of the peak CWA.
    d. Operations a-c are repeated until both the CWA and the alignment converges to acceptable values.

II.
    a. Once a plurality of sets of actuation parameters (herein below "basic sets") are determined, each set for a respective filter-state (gap), additional sets of actuation parameters are interpolated, based on the values in the basic sets. Given the actuation parameters of the basic sets, actuating parameters for filter-states residing between the filter-states of the basic sets can be determined. The specific interval between the additional sets can be defined according to the required resolution. For example, additional sets can be interpolated with average voltage intervals of 1 volt.
    b. Once the basic sets and additional sets of actuation parameters are available, providing a high-resolution distribution of sets across the spectra, the tunable filter is illuminated with white light and a scanning process is executed.
        i. During the scanning process the optical gap of the tunable filter is switched between filter-states defined by the collection of sets (basic and additional).
        ii. For each filter-state, the optical response (spectrometer readout) of the tunable filter is determined, thus determining a respective optical response for each set of actuation parameters. The central wavelength of each optical response is determined, thus determining a CWL for each set of actuation parameters.
        iii. The CWL values and respective actuation parameters are stored in a computer data-repository for later reference.

III.
    a. Once a plurality of sets of actuation parameters (herein below "basic sets") are determined, each set for a respective filter-state (gap), additional sets of actuation parameters are interpolated, based on the values in the basic sets. Given the actuation parameters of the basic sets, actuating parameters for filter-states residing between the filter-states of the basic sets can be determined. The specific interval between the additional sets can be defined according to the required resolution. For example, additional sets can be interpolated with average voltage intervals of 1 volt.
    b. Once the basic sets and additional sets of actuation parameters are available, providing a high-resolution distribution of sets across the spectra, the tunable filter is illuminated with a tunable light source light and a scanning process is executed.
        i. During the scanning process the optical gap of the tunable filter is switched between filter-states defined by the collection of sets (basic and additional).
        ii. For each filter-state, the tunable light source is tuned continuously over the sensitivity range of the tunable filter to determine the maximal optical response of the tunable filer while in the filter-state. The wavelength of the light at the maximal optical response is indicative of the transmission CWL at the filter state.
        iii. The CWL values and respective actuation parameters are stored in a computer data-repository for later reference.

The invention claimed is:

1. A calibration system being operatively connected to a light source, the calibration system comprising:
a tunable filter;
a camera; and
a processing circuitry; wherein the tunable filter comprises two mirrors where a desired spectral transmission profile of the filter is obtained by a specific gap between the two mirrors;
wherein the camera is configured to capture images of a surface of the tunable filter while being illuminated by the light source;
the processing circuitry is configured to execute operations comprising:
    process the images and identify interference fringes resulting from interference in the tunable filter and determine whether the interference fringes are symmetrically aligned around a certain area of the surface of the tunable filter which indicates that the two mirrors are parallel; and
    in case the interference fringes are not symmetrically aligned around the certain area, apply updated actuation parameters for adapting the gap between the mirrors and obtaining the desired spectral transmission profile.

2. The calibration system of claim 1, wherein following the adapting of the gap, the camera is configured to capture additional images of a surface of the tunable filter while the surface is being illuminated by the light source, and the processing circuitry is configured to repeat execution of the operations.

3. The calibration system of claim 1 wherein the tunable filter includes a Fabry perot tunable filter.

4. The calibration system of claim 3, wherein the tunable filter includes a MEMs Fabry perot tunable filter.

5. The calibration system of claim 3, wherein the tunable filter is integrated with the camera.

6. The calibration system of claim 1, further comprising a band pass filter allowing passage of light in one or more specific wave lengths.

7. The calibration system of claim 1 wherein the certain area is located at the center of the tunable filter.

8. A method of calibrating a tunable filter, the method comprising:
applying actuation parameters to the tunable filter, wherein the actuation parameters set a gap between two mirrors of the tunable filter to thereby obtain a desired spectral transmission profile;
illuminating the tunable filter by a light source;
capturing images a surface of the tunable filter while being illuminated by the light source;

executing operations comprising:
processing the images and identifying interference fringes resulting from interference in the tunable filter;
determining whether the interference fringes are symmetrically aligned around a certain area of the surface, which indicates that the two mirrors are parallel; and
in case the interference fringes are not symmetrically aligned around the certain area, applying updated actuation parameters for adapting the gap between the mirror and obtaining the desired spectral transmission profile.

9. The method of claim 8, further comprising:
following the adapting of the gap, capturing additional images of a surface of the tunable filter while the surface is being illuminated by the light source; and
repeating the execution of the operations.

10. The method of claim 8, wherein the tunable filter includes a Fabry perot tunable filter.

11. The method of claim 10, wherein the tunable filter includes a MEMs tunable filter.

12. A device, comprising:
a processing circuitry operatively connected to a detector;
wherein the device is configured to interact with a tunable filter and enable a light source to illuminate the tunable filter with a light beam; the processing circuitry is configured to:
determine, based on different optical responses, each optical response received at the detector from a respective illumination by the light source of a certain spatial portion of the tunable filter, whether a state of the tunable filter, complies with a desired condition; and in case it does not, apply updated actuation parameters for bringing the state of the tunable filter to the desired condition.

13. The device of claim 12, wherein the processing circuitry is configured to iteratively apply updated actuation parameters and compare between different optical responses until the state of the tunable filter is determined to be at the desired condition.

14. The device of claim 12, further comprising:
a light selective unit positioned between the tunable filter and the light source and configured to selectively transmit light illuminated by the light source during a respective illumination towards a certain spatial portion of the tunable filter, giving rise to a respective optical response;
the light selective unit is configured to be switched between different light selective states, wherein a different spatial portion of the tunable filter is illuminated in each light selective state and wherein the different optical responses which are compared by the processing circuitry are each obtained when the light selective unit is in a respective light selective state.

15. The device of claim 14, wherein the processing circuitry is configured to automatically switch the light selective unit between the different light selective states.

16. The device of claim 12, wherein the processing circuitry is further configured upon obtaining the desired condition, to store the actuation parameters in a computer data-storage device.

17. The device of claim 14, wherein the light selective unit is configured to selectively apply a light filter for filtering a desired wavelength range of illumination directed towards one or more portions on the tunable filter.

18. The device of claim 12, wherein a surface area of the detector is divided into at least two parts and wherein the processing circuitry is configured to compare between optical responses, each integrated over a respective part of the detector.

19. The device of claim 18, wherein the detector is an image sensor and wherein the surface area of the image sensor is divided into two halves and wherein the processing circuitry is configured to compare between optical responses, each integrated over a respective half of the image sensor.

20. A system, comprising:
a device; and
a light source for providing a certain illumination spectrum, the device including:
a processing circuitry operatively connected to a detector;
wherein the device is configured to interact with a tunable filter and enable a light source to illuminate the tunable filter with a light beam; the processing circuitry is configured to:
determine, based on different optical responses, each optical response received at the detector from a respective illumination by the light source of a certain spatial portion of the tunable filter, whether a state of the tunable filter, complies with a desired condition; and in case it does not, apply updated actuation parameters for bringing the state of the tunable filter to the desired condition and wherein the detector is being held in an optical assembly holder and configured to detect reflection of the illumination of the light source on different portions of the tunable filter.

21. The system of claim 20, further comprising an optical assembly holder configured to hold the light source for illuminating the tunable filter.

22. The system of claim 20, wherein the light source and the detector are formed in a single optical unit.

23. The system of claim 20, wherein the processing circuitry is configured to control execution of one or more of the following:
(a) applying actuation parameters for controlling the state of a movable member of the tunable filter, the state of the movable member defines the optical response of the tunable filter;
(b) controlling a light selective unit for illuminating selected portions of the tunable filter by the light source;
(c) controlling illumination by the light selective unit;
(d) analyzing optical responses of one or more portions, determining a tunable filter-state based thereon, and determining if the state of the tunable filter satisfies a predetermined condition; or
(e) tuning the illumination spectrum of the light source.

24. The system of claim 23, wherein in case the state of the tunable filter does not satisfy the predetermined condition, the processing circuitry is further configured to iteratively apply new actuation parameters for bringing the state of the tunable filter to the desired condition; and
upon obtaining the desired condition, storing the actuation parameters in a memory.

25. The system of claim 23, wherein the light beam is characterized by a given illumination spectrum and the processing circuitry is configured for matching the optical response of said given illumination spectrum in the tunable filter with a reference data indicative of a predetermined optical response profile for identifying a state of the tunable filter.

26. The system of claim 25 wherein said predetermined optical response profile comprises one or more intensity profiles of optical response of one or more wavelengths ranges.

27. The system of claim 20, further comprising the tunable filter.

28. A method of monitoring a state of a tunable filter, the method comprising:
applying actuation parameters to the tunable filter;
illuminating two or more portions of the tunable filter;
detecting optical response from said one or more portions; and
analyzing optical responses of said illumination from one or more portions and determining a tunable filter-state based thereon and determining if the state of the tunable filter satisfies a predetermined condition.

29. The method of claim 28, wherein in case the tunable filter state does not satisfy the predetermined condition, the method further comprising iteratively applying new actuation parameters for bringing the state of the tunable filter to the predetermined condition; and
upon obtaining the predetermined condition, storing the actuation parameters in a computer data storage device.

30. The method of claim 29, wherein applying new actuation parameters comprises applying different actuation parameters on different portions of the tunable filter.

31. The method of claim 28, further comprising filtering illumination of two or more portions with a desired bandwidth of wavelengths.

32. The method of claim 28, wherein said analyzing comprises identifying a predetermined profile of the optical response to determine the state of the tunable filter.

33. The method of claim 32, wherein said predetermined profile is characterized by a rate of change of a transmission or reflection profile of a certain wavelength through or from the tunable filter.

34. The method of claim 29, comprising matching the optical response with a reference data indicative of a predetermined optical response profile.

35. The method of claim 34, wherein said reference data comprises one or more intensity profiles of optical response of one or more wavelengths ranges.

36. A non-transitory program storage device readable by a computer, tangibly embodying a computer readable instructions executable by the computer to perform a computerized method of monitoring a state of a tunable filter, the method comprising:
applying actuation parameters to the tunable filter;
illuminating two or more portions of the tunable filter;
detecting optical response from said one or more portions;
analyzing optical responses of said illumination from one or more portions and determining a tunable filter-state based thereon and determining if the state of the tunable filter satisfies a predetermined condition.

37. A method for adjusting a tunable filter including movable and static members and a plurality of at least three actuators adapted for controlling a state of said tunable filter by actuating a relative position of the movable member relative to said static member; the method comprising:
illuminating said filter at thereof;
detecting a plurality of optical responses each optical response obtained in response to the illumination of a plurality of different spatial portions of the tunable filter; said detected optical responses being indicative to of state of said tunable filter associated with of geometric parameters of a gap between the movable and static members; and
based on said optical responses, determining updated actuation parameters for operating the plurality of actuators to adjust the state of said tunable filter towards a desired state.

38. The method of claim 37 wherein the plurality of at least three actuators comprise at least four actuators.

* * * * *